United States Patent
Steinmetz et al.

(10) Patent No.: US 12,173,179 B2
(45) Date of Patent: Dec. 24, 2024

(54) AQUEOUS POLYCARBOXYLIC ACID CONTAINING COATING COMPOSITION WITH IMPROVED LEVELING PROPERTIES

(71) Applicant: BASF COATINGS GMBH, Münster (DE)

(72) Inventors: Bernhard Steinmetz, Münster (DE); Peggy Jankowski, Würzburg (DE); Norbert Loew, Würzburg (DE); Klaus Eikelmann, Würzburg (DE); Katrin Deller, Munich (DE); Andreas Poppe, Münster (DE); Dominik Stoll, Münster (DE)

(73) Assignee: BASF COATINGS GMBH, Muenster (DE)

( * ) Notice: Subject to any disclaimer, the term of this patent is extended or adjusted under 35 U.S.C. 154(b) by 155 days.

(21) Appl. No.: 17/759,129

(22) PCT Filed: Jan. 8, 2021

(86) PCT No.: PCT/EP2021/050218
§ 371 (c)(1),
(2) Date: Jul. 20, 2022

(87) PCT Pub. No.: WO2021/148255
PCT Pub. Date: Jul. 29, 2021

(65) Prior Publication Data
US 2023/0235193 A1 Jul. 27, 2023

(30) Foreign Application Priority Data
Jan. 21, 2020 (EP) ..................... 20152865

(51) Int. Cl.
*C09D 175/12* (2006.01)
*B05D 7/00* (2006.01)
*C09D 5/02* (2006.01)
*C09D 7/20* (2018.01)
*C09D 7/63* (2018.01)

(52) U.S. Cl.
CPC ........... *C09D 175/12* (2013.01); *B05D 7/572* (2013.01); *C09D 5/028* (2013.01); *C09D 7/20* (2018.01); *C09D 7/63* (2018.01); *B05D 2503/00* (2013.01)

(58) Field of Classification Search
CPC combination set(s) only.
See application file for complete search history.

(56) References Cited

U.S. PATENT DOCUMENTS

| | | |
|---|---|---|
| 4,914,148 A | 4/1990 | Hille et al. |
| 5,334,420 A | 8/1994 | Hartung et al. |
| 5,368,944 A | 11/1994 | Hartung et al. |
| 5,571,861 A | 11/1996 | Klein et al. |
| 6,001,915 A | 12/1999 | Schwarte et al. |
| 6,129,989 A | 10/2000 | Sapper |
| 6,632,915 B1 | 10/2003 | Schwarte et al. |
| 6,737,468 B1 | 5/2004 | Bremser |
| 7,645,815 B2 * | 1/2010 | Hermes ................ C09D 133/08 523/172 |
| 8,211,504 B2 | 7/2012 | Wegner et al. |
| 8,569,438 B2 | 10/2013 | Groenewolt et al. |
| 9,090,732 B2 | 7/2015 | Poppe et al. |
| 10,160,871 B2 | 12/2018 | Corten et al. |
| 10,920,100 B2 | 2/2021 | Corten et al. |
| 2008/0220173 A1 | 9/2008 | Poppe et al. |
| 2018/0002476 A1 | 1/2018 | Reuter et al. |
| 2018/0346740 A1 | 12/2018 | Andersen et al. |
| 2021/0301147 A1* | 9/2021 | Bauer .................... B05D 7/572 |

FOREIGN PATENT DOCUMENTS

| | | |
|---|---|---|
| CN | 108485412 A | 9/2018 |
| DE | 4009858 A1 | 10/1991 |
| DE | 4437535 A1 | 4/1996 |
| DE | 19930665 A1 | 1/2001 |
| DE | 19948004 A1 | 7/2001 |
| DE | 10043405 C1 | 6/2002 |
| EP | 0228003 B2 | 3/1994 |
| EP | 0649865 A1 | 4/1995 |

(Continued)

OTHER PUBLICATIONS 17759129 calculations (Year: 2024).*
International Search Report and Written Opinion for corresponding PCT/EP2021/050218 mailed Feb. 9, 2021; 7 pages.
European Search Report for EP Patent Application No. 20152865.0, Issued on Jul. 1, 2020, 3 pages.
Hermann Römpp, "Römpp Lexikon, Lacke und Druckfarben", 1998, p. 176 and 451.

*Primary Examiner* — Peter A Salamon
(74) *Attorney, Agent, or Firm* — Armstrong Teasdale LLP

(57) ABSTRACT

Disclosed herein is an aqueous coating composition including an anionically stabilized binder, a color pigment, a polycarboxylic acid, and optionally a solvent. Further disclosed is a method for producing an aqueous coating composition by adding a solution of polycarboxylic acid in a solvent to a coating composition including an anionically stabilized binder and color pigment. Additionally disclosed is a method for producing a multicoat paint system by producing a basecoat layer or at least two directly consecutive basecoat layers directly on a substrate optionally coated with a first coating layer, producing a clearcoat layer directly on the basecoat layer or the topmost basecoat layer, and jointly curing the basecoat layer(s) and the clearcoat layer. At least one of the basecoat materials includes the aqueous coating composition disclosed herein and/or an aqueous coating prepared by the disclosed method. A multicoat paint system obtainable by the method is additionally disclosed.

19 Claims, No Drawings

(56) References Cited

FOREIGN PATENT DOCUMENTS

| | | |
|---|---|---|
| EP | 0877063 A2 | 11/1998 |
| EP | 1153989 A1 | 11/2001 |
| EP | 2457961 A1 | 5/2012 |
| EP | 3183303 A1 | 6/2017 |
| JP | 2000501993 A | 2/2000 |
| JP | 2003020435 A | 1/2003 |
| JP | 2007084678 A | 4/2007 |
| JP | 2018523561 A | 8/2018 |
| WO | 1991015528 A1 | 10/1991 |
| WO | 1992015405 A1 | 9/1992 |
| WO | 00/22050 A1 | 4/2000 |
| WO | 2006042585 A1 | 4/2006 |
| WO | 2008074490 A1 | 6/2008 |
| WO | 2009077182 A1 | 6/2009 |
| WO | 2009100938 A1 | 8/2009 |
| WO | 2016091546 A1 | 6/2016 |
| WO | 2017088988 A1 | 6/2017 |
| WO | WO-2018011311 A1 * | 1/2018 ............... B05D 7/14 |

\* cited by examiner

AQUEOUS POLYCARBOXYLIC ACID CONTAINING COATING COMPOSITION WITH IMPROVED LEVELING PROPERTIES

CROSS-REFERENCE TO RELATED APPLICATIONS

This application is a U.S. National Phase Application of International Patent Application No. PCT/EP2021/050218, filed Jan. 8, 2021, which claims priority to European Patent Application No. 20152865.0, filed Jan. 21, 2020, each of which is hereby incorporated by reference herein.

The present invention relates to an aqueous coating composition comprising at least one anionically stabilized binder B, at least one color pigment P, at least one polycarboxylic acid PC, and optionally at least one solvent S. Said coating composition is free of effect pigments. The present invention further relates to a method for producing an inventive aqueous coating composition by addition of a solution of the polycarboxylic acid PC in a solvent S to a coating composition comprising at least one anionically stabilized binder B and color pigment P. Moreover, the present invention relates to a method for producing a multicoat paint system by producing a basecoat layer or at least two directly consecutive basecoat layers directly on a substrate optionally coated with a first coating layer, producing a clearcoat layer directly on the basecoat layer or the topmost basecoat layer, and jointly curing the one or more basecoat layer(s) and the clearcoat layer. At least one of the basecoat materials comprises the aqueous coating composition of the invention and/or an aqueous coating prepared by the inventive method. Finally, the present invention relates to a multicoat paint system obtainable by the method of the invention.

STATE OF THE ART

Particularly in automotive finishing, but also in other sectors where there is a desire for coatings with high decorative effect and at the same time effective protection from corrosion, it is known practice to provide substrates with a plurality of coating films disposed one above another.

Multicoat paint systems are applied preferably by what is called the "wet-on-wet" method, meaning that a pigmented basecoat material is applied first and is recoated, after a short flashing time, without a baking step, with clearcoat material. Subsequently, basecoat and clearcoat layers are jointly baked.

The "wet-on-wet" method has acquired particular significance in the application of automotive metallic effect paints.

Economic and environmental reasons have dictated the use, in the production of multicoat systems, of aqueous basecoat compositions. The coating compositions for producing these basecoats must be capable of being processed by the nowadays customary, rational "wet-on-wet" method; that is, following a very short initial drying period, without a baking step, they must be capable of being recoated with a transparent topcoat, without exhibiting defects in their visual appearance, such as, for example, those known as "pinholes".

Furthermore, the coating composition must also exhibit sufficient stability on storage. A customary test is the storage of the material at 40° C.

Moreover, the rheological properties of the coating compositions must be custom-tailored to the "wet-in-wet" application in order to obtain a high-grade overall appearance, which is influenced in particular by effective leveling on the part of the coating compositions used. Moreover, the minimization of gel specks represents a challenge.

In principle the use of any of a wide variety of rheological assistants for the purpose of adjusting the rheological properties is known.

For example, EP 0 877 063 A2, WO 2009/100938A1, EP 2 457 961 A1, and EP 3 183 303 A1 describe aqueous coating compositions which comprise a polyamide having an acid number of ≥30 mg KOH/g or <10 mg KOH/g polyamide. The use of polyamides and also other water-insoluble constituents in aqueous coating compositions, however, can lead to incompatibilities between these compounds and the water-soluble constituents of the compositions. This results in particular in bittiness on processing by the "wet-on-wet" method and/or on incorporation of the polyamide into the coating compositions, and/or in inadequate storage stability (segregation or phase separation) of such coating compositions, particularly at relatively high temperatures such as, for example, temperatures 40° C. On addition of polyamides, moreover, there may be poor leveling and/or a poor appearance.

EP 1 153 989 A1 discloses aqueous coating compositions which comprise a polyamide having an acid number 30 mg KOH/g polyamide and also, as a further rheological assistant, a metal silicate consisting of very small, usually nanoscale, particles. A disadvantage of the presence of such a metal silicate, however, especially in combination with a polyamide having an acid number>30 mg KOH/g polyamide, in aqueous coating compositions may often be the incidence of pinholes and/or pops in the case of processing by means of the "wet-on-wet" method. Furthermore, the use of metal silicates is undesirable, since on account of their high surface area they enter into strong interactions with other formulation constituents, especially dispersing additives and/or binders having groups with pigment affinity. Minimizing these interactions requires a high level of dilution. That dilution, however, may negatively influence, in particular, the shear stability and the circulation line stability of the coating composition.

Also known are aqueous coating compositions which comprise a metal silicate, employed customarily as rheological assistant in aqueous coating compositions, such as the commercially available metal silicate "Laponite® RD". Disadvantageous in this case, however, are the increased incidence of pinholes and/or poor leveling in processing by means of the method described above.

Of advantage accordingly would be an aqueous coating composition that is free of effect pigments and that exhibits an effective leveling and minimization of gel specks as well as good optical and mechanical properties, while being substantially free from polyamides and/or metal silicates. It would also be advantageous for the composition to improve the lightness and flop index of metallic coatings applied "wet-on-wet" directly above a coating layer produced from the aqueous coating composition. Moreover, the aqueous coating compositions should have a high storage stability.

Object

The object of the present invention, accordingly, was that of providing an aqueous coating composition comprising a color pigment and exhibiting an effective leveling even without the use of polyamides and/or metal silicates. Moreover, the aqueous coating composition is to have good optical and mechanical properties as well as a high storage stability. Furthermore, the aqueous coating composition should increase the lightness and flop effect of a metallic coating layer applied "wet-on-wet" directly onto a coating layer formed form the aqueous coating composition.

Technical Solution

The objects described above are achieved by the subject matter claimed in the claims and also by the preferred embodiments of that subject matter that are described in the description hereinafter.

A first subject of the present invention is therefore an aqueous coating composition comprising
   (a) at least one anionically stabilized binder B,
   (b) at least one color pigment P,
   (c) at least one polycarboxylic acid PC, and
   (d) optionally at least one solvent S,
   wherein the coating composition comprises 0 wt. % of effect pigments.

The above-specified aqueous coating composition is hereinafter also referred to as coating composition of the invention and accordingly is a subject of the present invention. Preferred embodiments of the coating composition of the invention are apparent from the description hereinafter and also from the dependent claims.

The coating composition of the invention has an excellent leveling even without the addition of polyamides and/or metal silicates, more particularly without the addition of polyamides and metal silicates. This effective leveling is achieved through the use of at least one polycarboxylic acid PC in combination with at least one anionically stabilized binder B and optionally at least one solvent S. In combination with the anionically stabilized binder B, the polycarboxylic acid PC functions as an associative thickener and results in a high viscosity after releasing the shear stress without negatively influencing the low viscosity under shear. Thus, the inventive coating composition can be readily applied due to the low viscosity under shear. The drastic increase in viscosity upon release of the shear stress, i.e. after application of the coating composition on the substrate, leads to an excellent leveling effect. The use of the solvent S can increase the homogeneous incorporation of the polycarboxylic acid PC into the aqueous coating composition, so that gel specks and bittiness are prevented and a high storage stability is achieved. In accordance with the invention it is also possible for the polycarboxylic acid PC to be dissolved in the solvent S before being added to the aqueous coating composition. This solution has a high stability in storage and can therefore be incorporated, as a storage-stable intermediate, into the production process in a simple way as part of the production of the aqueous coating composition. Moreover, the addition of the polycarboxylic acid PC does not lead to any adverse impact on the optical and mechanical properties of the coating layers produced with the composition of the invention and multicoat paint systems comprising a basecoat layer prepared from the inventive coating composition. Despite the addition of the polycarboxylic acid PC, high solids contents can be realized for the coating composition of the invention.

Additionally, the use of the at least one polycarboxylic acid PC and anionically stabilized binder B optionally in combination with the at least one solvent S leads to an increased flop effect of a metallic coating applied "wet-on-wet" directly above a coating layer produced from the inventive aqueous coating composition. Without being bound to this theory, it is believed that the polycarboxylic acid PC migrates into the overlying metallic coating and increases the substantially parallel orientation of the effect pigments to the underlying substrate.

A further subject of the present invention is a method for producing a multicoat paint system by producing a basecoat layer or at least two directly consecutive basecoat layers directly on a substrate optionally coated with a first coating layer, producing a clearcoat layer directly on the basecoat layer or the topmost basecoat layer, and jointly curing the one or more basecoat layer(s) and the clearcoat layer. At least one of the basecoat materials comprises the aqueous coating composition of the invention and/or an aqueous coating prepared by the inventive method.

Yet a further subject of the present invention is a multicoat paint system which is obtainable by the method of the invention.

DETAILED DESCRIPTION

Definitions

First of all, a number of terms used in the context of the present invention will be explained.

The expression "aqueous coating composition" is known to the skilled person. It refers fundamentally to a coating composition which is not based exclusively on organic solvents. Indeed, any such coating composition based on organic solvents contains exclusively organic solvents and no water for dissolving and/or dispersing the components, or is a coating composition for which no water is added explicitly during its production, water entering the composition instead only in the form of contaminant, atmospheric moisture and/or solvent for any specific additives employed. Such a composition, in contrast to an aqueous coating composition, would be referred to as being solvent-based or "based on organic solvents". "Aqueous" in the context of the present invention should be understood preferably to mean that the coating composition comprises a water fraction of at least 20 wt. %, preferably at least 25 wt. %, very preferably at least 50 wt. %, based in each case on the total amount of the solvents present (that is, water and organic solvents). The water fraction in turn is preferably 60 to 100 wt. %, more particularly 65 to 90 wt. %, very preferably 70 to 85 wt. %, based in each case on the total amount of the solvents present.

The term "binder" in the sense of the present invention and in agreement with DIN EN ISO 4618 (German version, date: March 2007), refers preferably to those nonvolatile fractions of the composition of the invention that are responsible for forming the film, with the exception of any pigments and fillers therein, and more particularly refers to the polymeric resins which are responsible for film formation. The nonvolatile fraction may be determined by the method described in the Examples section.

To achieve an excellent flop effect, the aqueous coating composition must comprise at least one anionically stabilized binder B. Anionically stabilized binders B are understood in accordance with the invention to be binders which comprise groups that can be converted by neutralizing agents into anionic groups (potentially anionic groups). The anionic groups which can be converted by neutralizing agents into anionic groups are, for example, carboxylic, sulfonic and/or phosphonic acid groups, more particularly carboxylic acid groups.

The term "polycarboxylic acid" refers in accordance with the invention to aliphatic or aromatic carboxylic acids which have at least two carboxylic acid groups per molecule. These carboxylic acid groups may be converted wholly or partly by neutralizing agents into anionic groups.

The term "(meth)acrylate" shall refer hereinafter both to acrylate and to methacrylate.

The application of a coating composition to a substrate, or the production of a coating film on a substrate, are understood as follows: the respective coating composition is applied in such a way that the coating film produced therefrom is arranged on the substrate. However, a direct contact with the substrate is not necessary. Thus, other layers can be present between the coating film and the substrate. For example, in optional step (1), a cured coating layer (S1) is produced on the metallic substrate (S), but a conversion coating as described below, such as a zinc phosphate coating, may be arranged between the substrate and the cured coating layer (S1).

In contrast, the application of a coating composition directly to a substrate, or the production of a coating film directly on a substrate, results in a direct contact of the produced coating film and the substrate. Thus, more particularly, no other layer is present between the coating film and the substrate. Of course, the same principle applies to directly successive application of coating compositions or the production of directly successive coating films, for example in step (2)(b) of the present invention.

The term "flashing off" denotes the vaporization of organic solvents and/or water present in a coating composition after application, usually at ambient temperature (i.e. room temperature), for example 15 to 35° C. for a period of, for example, 0.5 to 30 minutes. Since the coating composition is still free-flowing at least directly after the application in droplet form, it can form a homogeneous, smooth coating film by leveling. After the flash-off operation, the coating film, however, is still not in a state ready for use. For example, it is no longer free-flowing, but is still soft and/or tacky, and in some cases only partly dried. More particularly, the coating film still has not cured as described below.

In contrast, intermediate drying takes place at, for example, higher temperatures and/or for a longer period, such that, in comparison to the flash-off, a higher proportion of organic solvents and/or water evaporates from the applied coating film. Thus, intermediate drying is usually performed at a temperature elevated relative to ambient temperature, for example of 40 to 90° C., for a period of, for example, 1 to 60 minutes. However, the intermediate drying does not give a coating film in a state ready for use either, i.e. a cured coating film as described below. A typical sequence of flash-off and intermediate drying operations would involve, for example, flashing off the applied coating film at ambient temperature for 5 minutes and then intermediately drying it at 80° C. for 10 minutes.

Accordingly, curing of a coating film is understood to mean the conversion of such a film to the ready-to-use state, i.e. to a state in which the substrate provided with the respective coating film can be transported, stored and used as intended. More particularly, a cured coating film is no longer soft or tacky, but has been conditioned as a solid coating film which does not undergo any further significant change in its properties, such as hardness or adhesion on the substrate, even under further exposure to curing conditions as described below.

In the context of the present invention, "physically curable" or the term "physical curing" means the formation of a cured coating film through release of solvent from polymer solutions or polymer dispersions, the curing being achieved through interlooping of polymer chains.

In the context of the present invention, "thermochemically curable" or the term "thermochemical curing" means the crosslinking, initiated by chemical reaction of reactive functional groups, of a paint film (formation of a cured coating film), it being possible to provide the activation energy for these chemical reactions through thermal energy. This can involve reaction of different, mutually complementary functional groups with one another (complementary functional groups) and/or formation of the cured layer based on the reaction of autoreactive groups, i.e. functional groups which inter-react with groups of the same kind. Examples of suitable complementary reactive functional groups and autoreactive functional groups are known, for example, from German patent application DE 199 30 665 A1, page 7 line 28 to page 9 line 24.

This crosslinking may be self-crosslinking and/or external crosslinking. If, for example, the complementary reactive functional groups are already present in an organic polymer used as a binder, for example a polyester, a polyurethane or a poly(meth)acrylate, self-crosslinking is present. External crosslinking is present, for example, when a (first) organic polymer containing particular functional groups, for example hydroxyl groups, reacts with a crosslinking agent known per se, for example a polyisocyanate and/or a melamine resin. The crosslinking agent thus contains reactive functional groups complementary to the reactive functional groups present in the (first) organic polymer used as the binder.

Especially in the case of external crosslinking, the one-component and multicomponent systems, especially two-component systems, known per se are useful. In one-component systems, the components to be crosslinked, for example organic polymers as binders and crosslinking agents, are present alongside one another, i.e. in one component. A prerequisite for this is that the components to be crosslinked react with one another, i.e. enter into curing reactions, only at relatively high temperatures of, for example, above 100° C. Otherwise, the components to be crosslinked would have to be stored separately from one another and only be mixed with one another shortly before application to a substrate, in order to avoid premature, at least partial thermochemical curing (cf. two-component systems). An example of a combination is that of hydroxy-functional polyesters and/or polyurethanes with melamine resins and/or blocked polyisocyanates as crosslinking agents. In two-component systems, the components to be crosslinked, for example the organic polymers as binders and the crosslinking agents, are present separately in at least two components which are combined only shortly prior to application. This form is chosen when the components to be crosslinked react with one another even at ambient temperatures or slightly elevated temperatures of, for example, 40 to 90° C. An example of a combination is that of hydroxy-functional polyesters and/or polyurethanes and/or poly(meth)acrylates with free polyisocyanates as crosslinking agents.

In the context of the present invention, "actinochemically curable" or the term "actinochemical curing" is understood to mean the fact that curing is possible using actinic radiation, namely electromagnetic radiation such as near infrared (NIR) and UV radiation, especially UV radiation, and corpuscular radiation such as electron beams for curing. Curing by UV radiation is commonly initiated by radical or cationic photoinitiators. Typical actinically curable functional groups are carbon-carbon double bonds, for which generally free-radical photoinitiators are used. Actinic curing is thus likewise based on chemical crosslinking.

In the case of a purely physically curing coating composition, curing is performed preferably between 15 and 90° C. over a period of 2 to 48 hours. In this case, curing may thus differ from the flash-off and/or intermediate drying operation merely by the duration of the curing step.

In principle, and within the context of the present invention, the curing of thermochemically curable, especially preferably thermochemically curable and externally crosslinking, one-component systems is performed preferably at temperatures of 80 to 250° C., more preferably 80 to 180° C., for a period of 5 to 60 minutes, preferably 10 to 45 minutes. Accordingly, any flash-off and/or intermediate drying phase which precedes the curing is performed at lower temperatures and/or for shorter periods.

In principle, and within the context of the present invention, the curing of thermochemically curable, especially preferably thermochemically curable and externally crosslinking, two-component systems is performed at temperatures of, for example, 15 to 90° C., preferably 40 to 90° C., for a period of 5 to 80 minutes, preferably 10 to 50 minutes. This of course does not rule out curing of a two-component system at higher temperatures. If, for example, both one-component and two-component systems are present within the films formed according to the inventive process, the joint curing is guided by the curing conditions needed for the one-component system, thus resulting in the use of higher curing temperatures as described for one-component systems. Accordingly, any flash-off and/or intermediate drying phase which precedes the curing is performed at lower temperatures and/or for shorter periods.

The measurement methods to be employed in the context of the present invention for determining certain characteristic variables are evident from the Examples section. Unless explicitly indicated otherwise, these measurement methods are to be used for determining the respective characteristic variable.

All the temperatures exemplified in the context of the present invention are understood as the temperature of the room in which the coated substrate is present. What is thus not meant is that the substrate itself must have the particular temperature.

All film thicknesses reported in the context of the present invention should be understood as dry film thicknesses. It is therefore the thickness of the cured film in each case. Hence, where it is reported that a coating material is applied at a particular film thickness, this means that the coating material is applied in such a way as to result in the stated film thickness after curing.

If reference is made in the context of the present invention to an official standard, this of course means the version of the standard that was current on the filing date, or, if no current version exists at that date, then the last current version.

Aqueous coating composition of the invention:
Anionically Stabilized Binder B (a):

As a first essential constituent, the coating composition of the invention comprises at least one anionically stabilized binder B. The excellent leveling properties are only achieved by combination of an anionically stabilized binder B and the polycarboxylic acid PC dissolved in solvent S. Where, conversely, nonionically stabilized binders are used, the addition of the polycarboxylic acid PC does not result in a high leveling property. Nonionically stabilized binders in this context are binders which in particular have significant fractions of certain water-soluble, nonionic groups, preferably poly(oxyalkylene) groups, polylactone groups such as polybutyrolactone groups, polyalcohol groups, such as polyvinyl alcohol groups, polyamide groups, such as polyacrylamide groups, and also polyvinylpyrrolidone groups, more particularly poly(oxyethylene) and/or poly(oxypropylene) groups.

The anionically stabilized binder B is preferably present in a defined total amount in the aqueous coating composition of the invention. In one preferred embodiment of the present invention, therefore, the at least one anionically stabilized binder B is present in a total amount of 40 to 95 wt. % solids, preferably of 50 to 90 wt. % solids, more particularly of 55 to 85 wt. % solids, based in each case on the total binder content of the coating composition. If more than one anionically stabilized binder B is used, then the aforesaid quantity ranges are based on the total amount of anionically stabilized binders B in the composition. The use of the at least one anionically stabilized binder B in the aforesaid quantity ranges leads, in combination with the at least one polycarboxylic acid PC, to excellent leveling properties and good optical and mechanical properties, without adversely affecting the storage stability of the inventive compositions.

In the context of the present invention it has proven advantageous if the anionically stabilized binder B is selected from the group consisting of aqueous polyurethane-polyurea dispersions comprising anionically stabilized polyurethane-polyurea particles (PPP).

The anionically stabilized polyurethane-polyurea particles (PPP) preferably have an average particle size of 40 to 2,000 nm and a gel fraction of at least 50%, and said anionically stabilized polyurethane-polyurea particles (PPP) comprise, in each case in reacted form, (Z.1.1) at least one isocyanate group-containing polyurethane prepolymer containing groups which are anionic and/or can be converted into anionic groups, and
(Z.1.2.) at least one polyamine containing two primary amino groups and one or two secondary amino groups.

The anionically stabilized polyurethane-polyurea particles (PPP) are in dispersion in water, or present in the form of an aqueous dispersion. The fraction of water in the dispersion is preferably 45 to 75 wt. %, preferably 50 to 70 wt. %, more preferably 55 to 65 wt. %, based in each case on the total amount of the dispersion. It is preferred for the dispersion to consist to an extent of at least 90 wt. %, preferably at least 92.5 wt. %, very preferably at least 95 wt. %, and more preferably at least 97.5 wt. %, of the polyurethane-polyurea particles (PPP) and water (the associated value is obtained by summating the amount of the particles (that is, of the polymer, determined via the solids content) and the amount of water).

The anionically stabilized polyurethane-polyurea particles (PPP) are polymer particles which are polyurethane-polyurea-based. The anionically stabilized polyurethane-polyurea particles (PPP) possess a gel fraction of at least 50% (for measurement method, see Examples section) and an average particle size (also called mean particle size) of 40 to 2,000 nanometers (nm) (for measurement method, see Examples section). The polyurethane-polyurea particles (PPP) therefore constitute a microgel. The reason is that on the one hand the polymer particles are in the form of comparatively small particles, or microparticles, and on the other hand they are at least partly intramolecularly crosslinked. The latter means that the polymer structures present within a particle equate to a typical macroscopic network with a three-dimensional network structure. Viewed macroscopically, however, a microgel of this kind continues to comprise discrete polymer particles.

Because the microgels represent structures which lie between branched and macroscopically crosslinked systems, they combine, consequently, the characteristics of macromolecules with network structure that are soluble in suitable organic solvents, and insoluble macroscopic networks, and so the fraction of the crosslinked polymers can be determined, for example, only following isolation of the solid polymer, after removal of water and any organic solvents, and subsequent extraction. The phenomenon utilized here is that whereby the microgel particles, originally soluble in suitable organic solvents, retain their inner network structure after isolation and behave, in the solid, like a macroscopic network. Crosslinking may be verified via the experimentally accessible gel fraction. Lastly, the gel fraction is that fraction of the polymer in the microgel that cannot be molecularly dissolved, as an isolated solid, in a solvent. It is necessary here to rule out a further increase in the gel fraction from crosslinking reactions subsequent to the isolation of the polymeric solid. This insoluble fraction corresponds in turn to the fraction of the polymer that is present in the form of intramolecularly crosslinked particles or particle fractions.

The polyurethane-polyurea particles (PPP) preferably possess a gel fraction of 50%, preferably of at least 60%, more preferably of at least 70%, more particularly of at least 80%. The gel fraction may therefore be up to 100% or nearly 100%, as for example 99% or 98%. In such a case, then, the entire, or almost the entire, polyurethane-polyurea polymer is in the form of crosslinked particles.

The polyurethane-polyurea particles (PPP) possess an average particle size of 40 to 2,000 nm preferably of 40 to 1500 nm, more preferably of 100 to 1,000 nm, more preferably still of 110 to 500 nm, more particularly of 120 to 300 nm. An especially preferred range is from 130 to 250 nm.

The polyurethane-polyurea particles (PPP) comprise, in each case in reacted form, (Z.1.1) at least one polyurethane prepolymer containing isocyanate groups and containing groups which are anionic and/or can be converted into anionic groups, and also (Z.1.2) at least one polyamine containing two primary amino groups and one or two secondary amino groups. The expression "the polyurethane-polyurea particles (PPP) comprise, in each case in reacted form, a polyurethane prepolymer (Z.1.1) and a polyamine (Z.1.2)" here means that an aforesaid NCO-containing polyurethane prepolymer (Z.1.1) and also a polyamine (Z.1.2) were used in preparing the polyurethane-polyurea particles (PPP) and that these two components react with one another to form urea compounds.

The polyurethane-polyurea particles (PPP) preferably consist of the two components (Z.1.1) and (Z.1.2), meaning that they are prepared from these two components. The polyurethane-polyurea particles (PPP) in dispersion in water may be obtained, for example, by a specific three-stage process.

In a first step (1) of this process, a composition (Z) is prepared. The composition (Z) comprises at least one, preferably precisely one, specific intermediate (Z.1) containing isocyanate groups and blocked primary amino groups. The preparation of the intermediate (Z.1) comprises the reaction of at least one polyurethane prepolymer (Z.1.1) containing isocyanate groups and groups which are anionic and/or can be converted into anionic groups, with at least one compound (Z.1.2a) which is derived from a polyamine (Z.1.2) and contains at least two blocked primary amino groups and at least one free secondary amino group.

For the purposes of the present invention, the component (Z.1.1) is referred to, for ease of comprehension, as a prepolymer.

The prepolymers (Z.1.1) comprise groups which are anionic and/or can be converted into anionic groups (that is, groups which can be converted into anionic groups through the use of neutralizing agents which are known and also specified later on below, such as bases). As the skilled person is aware, these groups are, for example, carboxylic, sulfonic and/or phosphonic acid groups, more particularly carboxylic acid groups (functional groups which can be converted into anionic groups by neutralizing agents), and also anionic groups derived from the aforementioned functional groups, such as, more particularly, carboxylate, sulfonate and/or phosphonate groups, preferably carboxylate groups. Introducing such groups is known to increase the dispersibility in water. Depending on the conditions selected, the stated groups may be present proportionally or almost completely in the one form (carboxylic acid, for example) or the other form (carboxylate), through the use, for example, of neutralizing agents that are described later on below.

To introduce the stated groups it is possible, during the preparation of the prepolymers (Z.1.1), to use starting compounds which as well as groups for reaction in the preparation of urethane bonds, preferably hydroxyl groups, further comprise the abovementioned groups, carboxylic acid groups for example. In this way the groups in question are introduced into the prepolymer.

Corresponding compounds contemplated for introducing the preferred carboxylic acid groups include—insofar as they contain carboxyl groups—polyether polyols and/or polyester polyols. Used with preference, however, are in any case low molecular mass compounds which have at least one carboxylic acid group and at least one functional group that is reactive toward isocyanate groups—hydroxyl groups, preferably. The expression "low molecular mass compound" means in the context of the present invention that the compounds in question have a molecular weight of less than 300 g/mol. The range from 100 to 200 g/mol is preferred. Examples of compounds preferred in this sense are monocarboxylic acids containing two hydroxyl groups, such as dihydroxypropionic acid, dihydroxysuccinic acid, and dihydroxybenzoic acid, for example. More particularly they are α,α-dimethylolalkanoic acids such as 2,2-dimethylolacetic acid, 2,2-dimethylolpropionic acid, 2,2-dimethylolbutyric acid, and 2,2-dimethylolpentanoic acid, especially 2,2-dimethylolpropionic acid.

The prepolymers (Z.1.1) therefore preferably contain carboxylic acid groups. Based on the solids content, they possess preferably an acid number of 10 to 30 mg KOH/g, more particularly 15 to 23 mg KOH/g (for measurement method, see Examples section).

The prepolymers (Z.1.1) are prepared preferably by reaction of diisocyanates with polyols. Examples of suitable polyols are saturated or olefinically unsaturated polyester polyols and/or polyether polyols as described for example in WO 2018/011311 A1 and WO 2016/091546 A1. Polyols used with preference for preparing the prepolymers (Z.1.1) are polyester diols which have been prepared using dimer fatty acids. Especially preferred are polyester diols prepared using dicarboxylic acids of which at least 50 wt. %, preferably 55 to 75 wt. %, of those used are dimer fatty acids. Dimer fatty acids are oligomers of forms of unsaturated monomeric fatty acids. Fatty acids are saturated or unsaturated, especially unbranched, monocarboxylic acids having 8 to 64 carbon atoms.

Additionally, for preparing the polymers (Z.1.1) it is also possible to use polyamines such as diamines and/or amino alcohols. Examples of diamines include hydrazine, alkyl- or cycloalkyldiamines such as propylenediamine and 1-amino-3-aminomethyl-3,5,5-trimethylcyclohexane, and examples of amino alcohols include ethanolamine or diethanolamine.

With regard to the polyisocyanates suitable for preparing the polyurethane prepolymers (Z.1.1) containing isocyanate groups, reference is made to the laid-open specifications WO 2018/011311 A1 and WO 2016/091546 A1. Preferred is the use of aliphatic diisocyanates, such as hexamethylene diisocyanate, isophorone diisocyanate (IPDI), dicyclohexylmethane 4,4'-diisocyanate, 2,4- or 2,6-diisocyanato-1-methylcyclohexane and/or m-tetramethylxylylene diisocyanate (m-TMXDI).

The number-average molecular weight of the prepolymers may vary widely and be situated for example in the range from 2000 to 20 000 g/mol, preferably from 3500 to 6000 g/mol (for measurement method, see Examples section).

The prepolymer (Z.1.1) contains isocyanate groups. Based on the solids content, it preferably possesses an isocyanate content of 0.5 to 6.0 wt. %, preferably 1.0 to 5.0 wt. %, especially preferably 1.5 to 4.0 wt. % (for measurement method, see Examples section).

The hydroxyl number of the prepolymer, based on the solids content, is preferably less than 15 mg KOH/g, more particularly less than 10 mg KOH/g, more preferably still less than 5 mg KOH/g (for measurement method, see Examples section).

The prepolymers (Z.1.1) may be prepared as described in WO 2018/011311 A1 and WO 2016/091546 A1.

As already indicated above, the groups which are present in the prepolymer (Z.1.1) and can be converted into anionic groups may also be present proportionally as correspondingly anionic groups, by the use of a neutralizing agent, for example. In this way it is possible to adjust the water dispersibility of the prepolymers (Z.1.1) and hence also of the intermediate (Z.1). Neutralizing agents contemplated include in particular the known basic neutralizing agents such as, for example, carbonates, hydrogen carbonates or hydroxides of alkali metals and alkaline earth metals, such as, for example LiOH, NaOH, KOH or Ca(OH)2. Also suitable for the neutralization and preferred in the context of the present invention for use are organic, nitrogen-containing bases such as amines like ammonia, trimethylamine, triethylamine, tributylamines, dimethylaniline, triphenylamine, dimethylethanolamine, methyldiethanolamine or triethanolamine, and also mixtures thereof.

If neutralization of the groups—particularly the carboxylic acid groups—which can be converted into anionic groups is desired, the neutralizing agent may be added, for example, in an amount such that a fraction of 35% to 65% of the groups is neutralized (degree of neutralization). Preferred is a range from 40% to 60% (for calculation method, see Examples section).

The compound (Z.1.2a) comprises two blocked primary amino groups and one or two free secondary amino groups.

Blocked amino groups, as is known, are those in which the hydrogen radicals on the nitrogen that are present inherently in free amino groups have been substituted by reversible reaction with a blocking agent. In view of the blocking, the amino groups cannot be reacted like free amino groups, via condensation or addition reactions, and in this respect are therefore nonreactive and so differ from free amino groups. The primary amino groups of the compound (Z.1.2a) may be blocked with the blocking agents that are known per se, as for example with ketones and/or aldehydes. In the case of such blocking, ketimines and/or aldimines are then produced, with release of water. Groups of this kind can be unblocked with addition of water.

If an amino group is specified neither as being blocked nor as being free, the reference is to a free amino group.

Preferred blocking agents for blocking the primary amino groups of the compound (Z.1.2a) are ketones. Particularly preferred among the ketones are those which are an organic solvent (Z.2) as described later on below. The reason is that this solvent (Z.2) must in any case be present in the composition (Z) to be prepared in stage (I) of the method. Through the use of ketones (Z.2) for blocking, the correspondingly preferred production process for blocked amines can therefore be employed, without the possibly unwanted blocking agent having to be separated off, at cost and inconvenience. Instead, the solution of the blocked amine can be used directly for preparing the intermediate (Z.1). Preferred blocking agents are acetone, methyl ethyl ketone, methyl isobutyl ketone, diisopropyl ketone, cyclopentanone or cyclohexanone; particularly preferred are the ketones (Z.2) methyl ethyl ketone and methyl isobutyl ketone.

The preferred blocking with ketones and/or aldehydes, especially ketones, and the associated preparation of ketimines and/or aldimines, have the advantage, moreover, that primary amino groups are blocked selectively. Secondary amino groups present are evidently unable to be blocked, and therefore remain free. Consequently, the compound (Z.1.2a) which as well as the two blocked primary amino groups also comprises one or two free secondary amino groups can be prepared readily by way of the stated preferred blocking reactions from a corresponding polyamine (Z.1.2) which contains free secondary and primary amino groups.

The compounds (Z.1.2a) preferably possess two blocked primary amino groups and one or two free secondary amino groups, and the primary amino groups they possess are exclusively blocked primary amino groups, and the secondary amino groups they possess are exclusively free secondary amino groups.

The compounds (Z.1.2a) preferably possess a total of three or four amino groups, these being selected from the group of blocked primary amino groups and of free secondary amino groups.

Especially preferred compounds (Z.1.2a) are those which consist of two blocked primary amino groups, one or two free secondary amino groups, and also aliphatically saturated hydrocarbon groups.

Analogous preferred embodiments are valid for the polyamines (Z.1.2), with these polyamines then containing free primary amino groups rather than blocked primary amino groups. Examples of preferred polyamines (Z.1.2), from which it is also possible to prepare compounds (Z.1.2a) by blocking of the primary amino groups, are diethylenetriamine, 3-(2-aminoethyl)aminopropylamine, dipropylenetriamine, and also N1-(2-(4-(2-aminoethyl)piperazin-1-yl) ethyl)ethane-1,2-diamine (one secondary amino group, two primary amino groups to be blocked) and triethylenetetramine, and also N,N'-bis(3-aminopropyl)ethylenediamine (two secondary amino groups, two primary amino groups to be blocked).

If a certain quantity of a polyamine is blocked, the blocking may result for example in a fraction of 95 mol % or more of the primary amino groups becoming blocked (this fraction can be determined by IR spectroscopy, see Examples section). Where, for example, a polyamine in the unblocked state possesses two free primary amino groups, and where the primary amino groups of a certain amount of this amine are then blocked, it is said in the context of the present invention that this amine has two blocked primary amino groups if a fraction of more than 95 mol % of the primary amino groups present in the amount employed are blocked.

The preparation of the intermediate (Z.1) comprises the reaction of the prepolymer (Z.1.1) with the compound (Z.1.2a) by addition reaction of isocyanate groups from (Z.1.1) with free secondary amino groups from (Z.1.2a). This reaction, which is known per se, then leads to the attachment of the compound (Z.1.2a) onto the prepolymer (Z.1.1) to form urea bonds, ultimately giving the intermediate (Z.1).

The intermediate (Z.1) may be prepared as described in WO 2018/011311 A1 and WO 2016/091546 A1.

The fraction of the intermediate (Z.1) is from 15 to 65 wt. %, preferably from 25 to 60 wt. %, more preferably from 30 to 55 wt. %, especially preferably from 35 to 52.5 wt. %, and, in one very particular embodiment, from 40 to 50 wt. %, based in each case on the total amount of the composition (Z).

The composition (Z) further comprises at least one specific organic solvent (Z.2). The solvents (Z.2) at a temperature of 20° C. possess a solubility in water of at most 38 wt. % (for measurement method, see Examples section). The solubility in water at a temperature of 20° C. is preferably less than 30 wt. %. A preferred range is from 1 to 30 wt. %. Accordingly, the solvent (Z.2) possesses a fairly moderate solubility in water, and more particularly is not completely miscible with water, or possesses no unlimited solubility in water.

Examples of solvents (Z.2) are methyl ethyl ketone, methyl isobutyl ketone, diisobutyl ketone, diethyl ether, dibutyl ether, dipropylene glycol dimethyl ether, ethylene glycol diethyl ether, toluene, methyl acetate, ethyl acetate, butyl acetate, propylene carbonate, cyclohexanone, or mixtures of these solvents. Preferred is methyl ethyl ketone, which at 20° C. has a solubility in water of 24 wt. %. No solvents (Z.2) are therefore solvents such as acetone, N-methyl-2-pyrrolidone, N-ethyl-2-pyrrolidone, tetrahydrofuran, dioxane, N-formylmorpholine, dimethylformamide or dimethyl sulfoxide.

The effect of selecting the specific solvents (Z.2) with only limited water solubility is in particular that on dispersing of the composition (Z) in aqueous phase, which takes place in step (II) of the process, a homogeneous solution cannot be formed directly, instead, the crosslinking reactions that take place within step (II) (addition reactions of free primary amino groups and isocyanate groups to form urea bonds) proceed in a limited volume, thereby enabling the formation of the microparticles as defined above.

The fraction of the at least one organic solvent (Z.2) is from 35 to 85 wt. %, preferably from 40 to 75 wt. %, more preferably from 45 to 70 wt. %, especially preferably from 47.5 to 65 wt. %, and, in one very particular embodiment, from 50 to 60 wt. %, based in each case on the total amount of the composition (Z).

Within the present invention it has emerged that as a result of the targeted combination of an as-above-specified fraction of the intermediate (Z.1) in the composition (Z) and of the selection of the specific solvent (Z.2) it is possible in accordance with the steps (II) and (III) described below to provide polyurethane-polyurea dispersions which comprise polyurethane-polyurea particles (PPP) having the requisite particle size and gel fraction.

The components (Z.1) and (Z.2) described account in total for preferably at least 90 wt. % of the composition (Z). The two components account for preferably at least 95 wt. %, more particularly at least 97.5 wt. %, of the composition (Z). With very particular preference the composition (Z) consists of these two components. In this context it may be noted that, where neutralizing agents as described above are employed, these neutralizing agents are included with the intermediate when calculating the amount of an intermediate (Z.1). The solids content of the composition (Z) preferably therefore corresponds to the fraction of the intermediate (Z.1) in the composition (Z). Accordingly, the composition (Z) preferably possesses a solids content of 15 to 65 wt. %, preferably of 25 to 60 wt. %, more preferably of 30 to 55 wt. %, especially preferably of 35 to 52.5 wt. %, and, in one very particular embodiment, from 40 to 50 wt. %.

A particularly preferred composition (Z) therefore comprises in total at least 90 wt. % of the components (Z.1) and (Z.2) and apart from the intermediate (Z.1) comprises exclusively organic solvents.

In step (II) of the process described here, then, the composition (Z) is dispersed in water, accompanied by deblocking of the blocked primary amino groups of the intermediate (Z.1) and by reaction of the resultant free primary amino groups with the isocyanate groups of the intermediate (Z.1) and also with the isocyanate groups of the deblocked intermediate resulting from the intermediate (Z.1), this reaction being an addition reaction.

Step (II) of the process may take place as described in WO 2018/011311 A1 and WO 2016/091546 A1.

The fraction of the polyurethane-polyurea particles (PPP) in the dispersion is preferably 25 to 55 wt. %, preferably 30 to 50 wt. %, more preferably 35 to 45 wt. %, based in each case on the total amount of the dispersion (determined analogously to the determination via the solids content as described above for the intermediate (Z.1)).

The polyurethane-polyurea particles (PPP) preferably possess an acid number of 10 to 35 mg KOH/g, more particularly of 15 to 23 mg KOH/g (for measurement method, see Examples section). Moreover, the polyurethane-polyurea particles possess very few hydroxyl groups or none. The OH number of the particles is therefore less than 15 mg KOH/g, more particularly less than 10 mg KOH/g, more preferably less than 5 mg KOH/g (for measurement method, see Examples section).

Particular preference is given to using anionically stabilized binders which have a certain electrophoretic mobility at a pH of 8.0. The electrophoretic mobility here may be determined as described in the Examples section. In one preferred embodiment of the present invention, therefore, the at least one anionically stabilized binder B has an electrophoretic mobility at a pH of 8.0 of −2.5 to −15 (μm/s)/(V/cm), preferably of −2.5 to −10 (μm/s)/(V/cm), more preferably of −4 to −8 (μm/s)/(V/cm), more particularly of −5 to −8 (μm/s)/(V/cm). The use of at least one anionically stabilized binder B having the aforesaid electrophoretic mobility leads, in combination with the at least one polycarboxylic acid PC, to an excellent leveling effect without adversely affecting the performance properties and the optical and coloristic properties of the coating layer prepared with the inventive compositions.

The coating composition may comprise the aqueous polyurethane-polyurea dispersion in a total amount of 1 to 60 wt. % solids, preferably of 5 to 50 wt. % solids, more preferably of 10 to 40 wt. % solids, most preferably 15 bis 40 wt. % solids, based in each case on the total binder content of the coating composition. The use of the aqueous polyurethane-polyurea dispersion in the aforesaid total amounts, in combination with the at least one polycarboxylic acid PC, results in excellent leveling properties without negatively influencing the mechanical and optical properties of the resulting coating layer.

Apart from the afore-described aqueous polyurethane-polyurea dispersion, the inventive coating compositions may comprise further anionically stabilized binders B. Suitable anionically stabilized binders B that can be used according to the invention are, for example, self-crosslinking aqueous dispersions comprising at least one polyhydrazide and at least one carbonyl-containing urethane-vinyl hybrid polymer. Suitable self-crosslinking aqueous dispersions are, for example, described in EP 0 649 865 A1. The total amount of such anionically stabilized binders B typically ranges from 0 to 45 wt. % solids, based on the total binder content of the coating composition.

Color Pigment P (b):

As a second essential constituent (b), the coating composition of the invention comprises at least one color pigment P. Such color pigments are known to those skilled in the art and are described, for example, in Römpp-Lexikon Lacke and Druckfarben, Georg Thieme Verlag, Stuttgart, New York, 1998, pages 176 and 451. The terms "coloring pigment" and "color pigment" are interchangeable.

Suitable color pigments P are preferably selected from the group consisting of (i) white pigments such as titanium dioxide, zinc white, zinc sulfide or lithopone; (ii) black pigments such as carbon black, iron manganese black, or spinel black; (iii) chromatic pigments such as ultramarine green, ultramarine blue, manganese blue, ultramarine violet, manganese violet, red iron oxide, molybdate red, ultramarine red, brown iron oxide, mixed brown, spinel phases and corundum phases, yellow iron oxide, bismuth vanadate; (iv) organic pigments such as monoazo pigments, bisazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, prinone pigments, perylene pigments, phthalocyanine pigments, aniline black, and (v) mixtures thereof.

The at least one color pigment P is used preferably in a particular total amount. In preferred embodiments of the first subject-matter of the invention, therefore, the aqueous coating composition comprises the at least one color pigment P in a total amount of 1 to 40 wt. %, preferably of 2 to 35 wt. %, more preferably of 5 to 30 wt. %, based in each case on the total weight of the coating composition.

The inventive aqueous coating composition does not comprise any effect pigments, i.e. the amount of effect pigments in the inventive compositions is 0 wt. %, based on the total weight of the coating composition.

Polycarboxylic Acid PC (c):

As a third essential constituent, the aqueous coating composition of the invention comprises at least one polycarboxylic acid PC.

The neutralization level of the at least one polycarboxylic acid PC is preferably at least 5%, preferably at least 10%, more preferably from 10 to 100%. The level of neutralization is the amount of carboxylic acid groups which are neutralized with a base. The above-mentioned level of neutralization leads to an improved dissolution of the polycarboxylic acid PC in the aqueous coating composition and thus minimizes gel specks while improving leveling properties and storage stability of the coating composition.

The at least one polycarboxylic acid PC is more preferably a dicarboxylic acid. Dicarboxylic acids in accordance with the invention are compounds which have precisely two carboxylic acid groups per molecule.

In this context it is especially preferred if the dicarboxylic acid has the general formula (I)

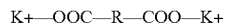

in which
R is a linear or branched saturated $C_4$-$C_{30}$ alkyl group, a linear or branched unsaturated $C_{10}$-$C_{72}$ alkyl group, a cycloalkyl group or an aromatic group, preferably a linear saturated $C_7$ alkyl group, and
K+ is hydrogen or a cation.

Preferably K+ is a cation. More preferably K+ is a base used for the at least partial neutralization of the polycarboxylic acid PC. Very preferably it is cationic N,N'-dimethylethanolamine.

Particularly preferred dicarboxylic acids are selected from azelaic acid, pimelic acid, suberic acid, sebacic acid, dodecandioic acid and phthalic acid and mixtures thereof. With particular preference, the inventive coating compositions comprise exactly one of the afore-listed dicarboxylic acids.

The use of the above-recited dicarboxylic acids has proven to be particularly advantageous, in combination with the at least one anionically stabilized binder B, for the attainment of excellent leveling properties without negatively influencing the storage stability of the coating composition and the optical and mechanical properties of coating layers produced from these compositions. Moreover, the use of these polycarboxylic acids, preferably azelaic acid, pimelic acid, suberic acid, sebacic acid, dodecandioic acid and phthalic acid and mixtures thereof, in combination with at least one anionically stabilized binder B, leads to an improved flop effect of metallic coating layers applied directly on a coating layer produced from the inventive coating composition. Polycarboxylic acids used in accordance with the invention are commercially available, for example, from Merck.

The at least one polycarboxylic acid PC is preferably used in a particular total amount. It is therefore particularly preferred in accordance with the invention if the aqueous coating composition comprises the at least one polycarboxylic acid PC, more particularly the dicarboxylic acid in formula (I), in a total amount of 0.01 to 4 wt. %, more preferably of 0.02 to 2 wt. %, more particularly of 0.05 to 1 wt. %, based in each case on the total weight of the coating composition. The use of the polycarboxylic acid PC, especially of the above-described dicarboxylic acid of formula (I), in the stated total amounts, in combination with the at least one anionically stabilized binder B, leads to excellent leveling properties without negatively influencing the good optical and mechanical properties of coating layers produced from the inventive coating composition. Moreover, the storage stability of the coating composition is not reduced upon addition of the polycarboxylic acid PC. Furthermore, the flop effect of a metallic coating layer applied directly on a coating layer produced with the inventive coating composition is improved on addition of only small amounts of the polycarboxylic acid PC.

Solvent S (d):

As optional constituent, the aqueous coating composition of the invention can comprise at least one solvent S. This solvent S may serve for solubilizing the at least one polycarboxylic acid PC and can facilitate the homogeneous incorporation of the polycarboxylic acid PC into the coating composition, thus resulting in a high storage stability of the coating composition and effective leveling properties.

The at least one solvent S is preferably selected from water, alkoxy-$C_2$-$C_{10}$ alcohols, ketones, esters, amides, methylal, butylal, 1,3-dioxolane, glycerol formal, and mixtures thereof, more particularly from water and/or alkoxy-$C_2$-$C_{10}$ alcohols. The use of water and/or alkoxy-$C_2$-$C_{10}$ alcohols, in particular, for solubilizing the polycarboxylic acid PC has proven advantageous in terms of homogeneous incorporation, thus resulting in a high storage stability of the inventive compositions and excellent leveling properties.

If the at least one solvent S is present in the aqueous coating composition, the total amount of said solvent S, more particularly water and/or alkoxy-$C_2$-$C_{10}$ alcohols, is 0.01 to 15 wt. %, preferably of 0.05 to 10 wt. %, more preferably of 0.1 to 5 wt. %, more particularly of 0.2 to 2 wt. %, based in each case on the total weight of the coating composition. In case water is used as solvent S, the amount of solvent S is taken into account when calculating the total amount of water present in the aqueous coating composition. The use of the aforesaid amounts of the at least one solvent S, more particularly of water and/or alkoxy-$C_2$-$C_{10}$ alcohols, leads to sufficient solubilization of the at least one polycarboxylic acid PC in the aqueous coating composition and in this way ensures excellent leveling properties and a high storage stability. Moreover, it enables homogeneous incorporation of the polycarboxylic acid PC in the aqueous coating composition.

Further Constituents (e):

The aqueous coating composition of the invention may, besides the above-recited mandatory constituents (a) to (d), also comprise further constituents, selected from the group of neutralizing agents, thickeners, crosslinking agents and mixtures thereof.

The neutralizing agent is preferably selected from the group of inorganic bases, primary amines, secondary amines, tertiary amines, and mixtures thereof, especially N,N'-dimethylethanolamine. The neutralizing agent, especially N,N'-dimethylethanolamine, is used with particular preference for neutralizing the at least one polycarboxylic acid PC. In this way the solubility of the polycarboxylic acid PC in the solvent S as well as in the aqueous coating composition can be increased.

It is preferred in this context if the at least one neutralizing agent, especially N,N'-dimethylethanolamine, is present in a total amount of 0.05 to 5 wt. %, preferably of 0.05 to 4 wt. %, more preferably of 0.05 to 1 wt. %, more particularly of 0.05 to 0.2 wt. %, based in each case on the total weight of the coating composition. The use of the neutralizing agent, especially N,N'-dimethylethanolamine, in the quantity ranges recited above, optionally in combination with the at least one solvent S, ensures sufficient solubilization of the polycarboxylic acid PC and hence guarantees a homogeneous incorporation and high storage stability of the coating compositions of the invention.

The thickener is preferably selected from the group of phyllosilicates, (meth)acrylic acid-(meth)acrylate copolymers, nonionic polyurethanes, hydrophobically modified polyethers, hydroxyalkylcelluloses, polyamides, and mixtures thereof, especially nonionic polyurethanes. (Meth) acrylic acid-(meth)acrylate copolymers are obtainable by reaction of (meth)acrylic acid with (meth)acrylic esters. Depending on the length of the carbon chain in the (meth) acrylic esters, these copolymers have an associative thickening effect (ASE or HASE thickeners). Copolymers containing exclusively $C_1$-$C_4$ alkyl(meth)acrylates do not have an associative thickening effect (ASE thickeners). Conversely, copolymers which contain (meth)acrylates having a chain length of more than four carbon atoms do possess an associative thickening effect (HASE thickeners). Hydrophobically modified ethoxylated polyurethanes are obtainable by reaction of a diisocyanate with a polyether and subsequent reaction of this prepolymer with a hydrophobic alcohol. Such polyurethanes are also referred to as HEUR thickeners. Particularly preferred is the use of a combination of non-associative thickening (meth)acrylic acid-(meth) acrylate copolymers and hydrophobically modified ethoxylated polyurethanes.

It is preferred in this context if the at least one thickener, more particularly nonionic polyurethane, is present in a total amount of 0.015 to 3 wt. %, preferably of 0.03 to 2 wt. %, more preferably of 0.04 to 1 wt. %, more particularly of 0.05 to 0.7 wt. %, based in each case on the total weight of the coating composition.

According to one particularly preferred embodiment of the present invention, the aqueous coating composition comprises no phyllosilicates and/or polyamides, more particularly no phyllosilicates and no polyamides. This means that the coating composition comprises 0 wt. %, based on the total weight of the coating composition, of phyllosilicates, more particularly sodium magnesium silicates and/or lithium aluminum magnesium silicates, and/or polyamides. Surprisingly, the use of a polycarboxylic acid PC without additional use of polyamides and/or phyllosilicates leads to excellent leveling properties which are comparable with the use of polyamides and/or phyllosilicates. When the at least one polycarboxylic acid PC is used, however, there are no unwanted separation phenomena and no reduced shear stability.

The crosslinking agent is preferably selected from the group consisting of melamine-formaldehyde resins, free and/or blocked polyisocyanates, polycarbodiimides, and mixtures thereof, more particularly melamine-formaldehyde resins.

It is preferred in this context if at least one crosslinking agent, especially melamine-formaldehyde resin, is present in a total amount of 5 to 50 wt. %, preferably of 7 to 45 wt. %, very preferably of 10 to 40 wt. %, based in each case on the total binder content of the coating composition. The aforesaid total quantities ensure sufficient crosslinking of the aqueous coating composition.

The coating composition of the invention has a relatively high solids content in spite of the use of polycarboxylic acid PC. It is therefore preferred if the composition has a solids content of 15 to 60 wt. %, based on the total weight of the coating composition and measured according to DIN EN ISO 3251 (June 2008). In light of the high solids content, the coating compositions of the invention have a good environmental profile without any adverse effect, though, on their storage stability. The storage stability can be described for example by viscosity measurements in the liquid state over time.

The coating composition of the invention preferably has a pH of 7 to 10, more particularly of 7 to 9, measured in each case at 23° C.

Inventive Method to Produce an Aqueous Coating Composition:

The coating composition of the invention is preferably obtained by
 (1) providing a solution comprising at least one polycarboxylic acid PC, at least one solvent S, and optionally at least one neutralizing agent and
 (2) adding the solution provided in step (1) to an aqueous composition comprising at least one anionically stabilized binder B and at least one color pigment P.

Preparation of the solution in step (1) ensures homogeneous incorporation of the polycarboxylic acid PC in the aqueous composition. Additionally, the use of the solution prepared in step (1) minimizes the risk of undesired gel speck formation during the addition of the polycarboxylic acid PC to the aqueous composition comprising the anionically stabilized binder B and the at least one color pigment P. Moreover, this solution is storage stable and can therefore be easily integrated as an intermediate product into the product process of the aqueous coating compositions.

Regarding the polycarboxylic acid PC, the solvent S, the anionically stabilized binder B, the color pigment P, and the neutralizing agent, the statements made in relation to the coating composition of the invention apply mutatis mutandis.

Inventive Method for Producing a Multicoat Paint System:

The inventive method for producing a multicoat paint system (M) on a substrate (S), comprises the following steps:

(1) optionally producing a cured first coating layer (S1) on the substrate (S) by application of a composition (Z1) to the substrate (S) and subsequent curing of the applied composition (Z1), (2) producing a basecoat layer (BL2a) or at least two directly consecutive basecoat layers (BL2-x) directly on the first coating layer (S1) by application of an aqueous basecoat material (bL2a) directly to the first coating layer (S1) or directly consecutive application of at least two aqueous basecoat materials (bL2-x) directly to the first coating layer (S1), (3) producing a clearcoat layer (C) directly on the basecoat layer (BL2a) or on the topmost basecoat layer (BL2-z) by application of a clearcoat material (cm) directly to the basecoat layer (BL2a) or to the topmost basecoat layer (BL2-z), (4) jointly curing the basecoat layer (BL2a) and the clearcoat layer (C) or the basecoat layers (BL2-x) and the clearcoat layer (C), wherein the at least one basecoat material (bL2a) or at least one of the basecoat materials (bL2-x) comprises an inventive aqueous coating composition and/or the at least one basecoat material (bL2a) or at least one of the basecoat materials (bL2-x) is obtained by the inventive method to produce and aqueous coating composition.

The substrate (S) is preferably selected from metallic substrates, metallic substrates coated with a cured electrocoat, plastic substrates, reinforced plastic substrates and substrates comprising metallic and plastic components, especially preferably from metallic substrates.

In this respect, preferred metallic substrates (S) are selected from iron, aluminum, copper, zinc, magnesium and alloys thereof as well as steel. Preferred substrates are those of iron and steel, examples being typical iron and steel substrates as used in the automobile industry sector. The substrates themselves may be of whatever shape—that is, they may be, for example, simple metal panels or else complex components such as, in particular, automobile bodies and parts thereof.

Preferred plastic substrates (S) are basically substrates comprising or consisting of (i) polar plastics, such as polycarbonate, polyamide, polystyrene, styrene copolymers, polyesters, polyphenylene oxides and blends of these plastics, (ii) synthetic resins such as polyurethane RIM, SMC, BMC and (iii) polyolefin substrates of the polyethylene and polypropylene type with a high rubber content, such as PP-EPDM, and surface-activated polyolefin substrates. The plastics may furthermore be fiber-reinforced, in particular using carbon fibers and/or metal fibers.

As substrates (S) it is also possible, moreover, to use those which contain both metallic and plastics fractions. Substrates of this kind are, for example, vehicle bodies containing plastics parts.

The substrates (S) may be pretreated before step (1) of the inventive process or before applying the composition (Z1) in any conventional way—that is, for example, cleaned (for example mechanically and/or chemically) and/or provided with known conversion coatings (for example by phosphating and/or chromating) or surface activating pre-treatments (for example by flame treatment, plasma treatment and corona discharge coming).

Step (1):

In step (1) of the inventive process, a cured first coating layer (S1) may be produced on the substrate (S) by application of a composition (Z1) to the substrate (S) and subsequent curing of the composition (Z1). This step is preferably performed if the substrate (S) is a metallic substrate.

The composition (Z1) may be an electrocoat material and may also be a primer coat. A primer coat in accordance with the invention, however, is not the basecoat applied in step (2) of the method of the invention. The method of the invention is preferably carried out with metallic substrates (S). The first coat (S1), therefore, is more particularly a cured electrocoat (E1). In one preferred embodiment of the method of the invention, accordingly, the composition (Z1) is an electrocoat material which is applied electrophoretically to the substrate (S). Suitable electrocoat materials and also their curing are described in WO 2017/088988 A1, and comprise a hydroxy-functional polyether amines as binder and blocked polyisocyanates as crosslinking agent.

The applied composition (Z1) is flashed off, for example, at 15 to 35° C. for a period of, for example, 0.5 to 30 minutes and/or intermediately dried at a temperature of preferably 40 to 90° C. for a period of, for example, 1 to 60 minutes. The applied composition (Z1) is preferably cured at temperatures of 100 to 250° C., preferably 140 to 220° C. for a period of 5 to 60 minutes, preferably 10 to 45 minutes, which produces the cured first coating layer (S1).

The layer thickness of the cured first coating layer ($C_1$) is, for example, 10 to 40 µm, preferably 15 to 25 µm.

Step (2):

Step (2) of the inventive process either comprises production of exactly one basecoat layer (BL2a) (step (2)(a)) or production of at least two directly successive basecoat layers (BL2-a) and (BL2-z) (step (2)(b)). The layers are produced by (a) applying an aqueous basecoat composition (bL2a) directly to the substrate (S) or the cured first coating layer (S1) or (b) directly successively applying at least two basecoat compositions (bL2-a) and (bL2-z) to the substrate (S) or the cured first coating layer (S1). After having been produced, therefore, the basecoat film (BL2a) according to step (2)(a) is disposed directly on the substrate (S) or directly on the cured first coating layer (S1).

The directly successive application of at least two, i.e. a plurality of, basecoat compositions to the substrate (S) or the cured first coating layer (S1) is thus understood to mean that a first basecoat composition (bL2-a) is applied directly to the substrate (S) or the cured first coating layer (S1) and then a second basecoat composition (bL2-b) is applied directly to the layer of the first basecoat composition. Any third basecoat composition (bL2-c) is then applied directly to the layer of the second basecoat composition. This operation can then be repeated analogously for further basecoat compositions (i.e. a fourth, fifth, etc. basecoat composition). The uppermost basecoat layer obtained after step (2)(b) of the inventive method is denoted as basecoat layer (BL2-z).

The basecoat layer (BL2a) or the first basecoat layer (BL2-a) is thus arranged directly on the substrate (S) or the cured first coating layer (S1).

The terms "basecoat composition" and "basecoat layer" in relation to the coating compositions applied and coating films produced in step (2) of the inventive process are used for the sake of better clarity. The basecoat layer or layers is/are cured together with the clearcoat material, the curing is thus achieved analogously to the curing of so-called basecoat compositions used in the standard method described in the introduction. More particularly, the coating compositions used in step (2) of the process of the invention are not cured separately, like the coating compositions referred to as primer-surfacers in the context of the standard methods. In connection with step (2)(b), the basecoat compositions and basecoat layers are generally designated by (bL2-x) and (BL2-x), wherein the x is replaced by other appropriate letters in the naming of the specific individual basecoat compositions and basecoat layers.

A preferred embodiment of variant (b) of step (2) of the inventive process is the use of exactly two basecoat compositions. Thus, two aqueous basecoat compositions (bL2-a) and (bL2-z) are applied in direct sequence directly to the cured first coating layer (S1) to form two basecoat layers (BL2-a) and (BL2-z) directly upon each other. The basecoat materials may be identical or different. It is also possible to produce two or more basecoat films (BL2-x) with the same basecoat material, and one or more further basecoat films (BL2-x) with one or more other basecoat materials. At least one of the aqueous basecoat materials (bL2-x) used in step (2)(b), however, comprises the inventive aqueous coating composition of the invention and/or the aqueous coating composition prepared by the inventive method.

In a particular preferred embodiment of step (2)(b), the first aqueous basecoat composition (bL2-a) is corresponding to the inventive coating composition while the second basecoat composition (bL2-z) is an effect pigment containing basecoat composition. This results in an improved lightness and flop index of the metallic coating composition used as the second basecoat composition (bL2-z), without negatively influencing the mechanical properties of the obtained multicoat paint system (M).

The basecoat composition (bL2-z) used in step (2)(b) of the inventive process, contains at least one binder. A preferred aqueous basecoat compositions (bL2-z) therefore comprises at least one hydroxy-functional polymer as binder, said at least one hydroxy-functional polymer being selected from the group consisting of a polyurethane, a polyester, a polyacrylate, copolymers thereof and mixtures of these polymers. Preferred polyurethane-polyacrylate copolymers (acrylated polyurethanes) and the preparation thereof are described, for example, in WO 91/15528 A1, page 3 line 21 to page 20 line 33, and in DE 4437535 A1, page 2 line 27 to page line 22. The binders preferably possess an OH number in the range from 20 to 200 mg KOH/g, more preferably from 40 to 150 mg KOH/g.

The proportion of the binder, preferably the at least one polyurethane-polyacrylate copolymer, is preferably in the range from 0.5 to 20% by weight, more preferably 1 to 15% by weight, especially preferably 1.5 to 10% by weight, based in each case on the total weight of the aqueous basecoat composition.

The basecoat composition (bL2-z) used in step (2)(b) of the inventive process is favorably colored, i.e. it preferably contains at least one coloring and/or effect pigment. Thus, the aqueous basecoat composition (bL2-z) preferably comprises at least one coloring and/or effect pigment, more preferably at least one coloring and effect pigment. Use of coating compositions (bL2-z) comprising at least one effect pigment result, in combination with the use of the inventive coating composition as aqueous basecoat composition (bL2-a), in an improved lightness and flop index. This improved lightness and flop index is due to the presence of a combination of polycarboxylic acid PC, anionically stabilized binder B and solvent S in the first aqueous basecoat composition (bL2-a).

In this regard, preferred coloring pigments are pigments described in connection with the color pigment P present in the inventive aqueous coating composition.

Useful effect pigments are selected from the group consisting of (i) platelet-shaped metal effect pigments such as lamellar aluminum pigments, (ii) gold bronzes; (iii) oxidized bronzes and/or iron oxide-aluminum pigments; (iv) pearlescent pigments such as pearl essence; (v) basic lead carbonate; (vi) bismuth oxide chloride and/or metal oxide-mica pigments; (vii) lamellar pigments such as lamellar graphite, lamellar iron oxide; (viii) multilayer effect pigments composed of PVD films; (ix) liquid crystal polymer pigments; and (x) mixtures thereof.

The at least one coloring and/or effect pigment is preferably present in the at least one aqueous basecoat composition (bL2-z) in a total amount 1 to 40% by weight, preferably 2 to 35% by weight, more preferably 5 to 30% by weight, based on the total weight of the aqueous basecoat composition (bL2-z) in each case.

In addition, the basecoat composition (bL2-z) used in step (2)(b) of the inventive process preferably comprises at least one typical crosslinking agent known per se. Favorably, the aqueous basecoat (bL2-z) comprises at least one crosslinking agent selected from the group consisting of blocked polyisocyanates and/or aminoplast resins, preferably aminoplast resins. Among the aminoplast resins, melamine resins in particular are preferred.

The proportion of the crosslinking agents, especially aminoplast resins and/or blocked polyisocyanates, more preferably aminoplast resins, among these preferably melamine resins, is preferably in the range from 5 to 50% by weight, more preferably 7 to 45% by weight, especially preferably 10 to 40% by weight, based in each case on the total binder content of the coating composition.

Preferably, the basecoat composition (bL2-z) used in step (2)(b) of the inventive process additionally comprises at least one thickener. Suitable thickeners are disclosed in connection with the inventive aqueous coating compositions above. An especially preferred thickener is selected from the group of phyllosilicates. The proportion of the thickeners is preferably in the range from 0.01 to 5% by weight, preferably 0.02 to 4% by weight, more preferably 0.05 to 3% by weight, based in each case on the total weight of the aqueous basecoat composition (bL2-z).

In addition, the aqueous basecoat composition (bL2-z) may also comprise at least one additive. Examples of such additives are salts which can be broken down thermally without residue or substantially without residue, resins as binders that are curable physically, thermally and/or with actinic radiation and are different than the polymers already mentioned, further crosslinking agents, organic solvents, reactive diluents, transparent pigments, fillers, dyes soluble in a molecular dispersion, nanoparticles, light stabilizers, antioxidants, deaerating agents, emulsifiers, slip additives, polymerization inhibitors, initiators of free-radical polymerizations, adhesion promoters, flow control agents, film-forming assistants, sag control agents (SCAs), flame retardants, corrosion inhibitors, waxes, siccatives, biocides, and flatting agents. Suitable additives of the aforementioned kind are known, for example, from German patent application DE 199 48 004 A1, page 14 line 4 to page 17 line 5, German patent DE 100 43 405 C1, column 5, paragraphs [0031] to [0033]. They are used in the customary and known amounts. For example, the proportion thereof may be in the range from 1.0 to 20% by weight, based in each case on the total weight of the aqueous basecoat composition (bL2-z).

The solids content of the basecoat composition (bL2-z) may vary according to the requirements of the individual case. The solids content is guided primarily by the viscosity required for application, more particularly for spray application, and so may be adjusted by the skilled person on the basis of his or her general art knowledge, optionally with assistance from a few exploratory tests. The solids content of the basecoat composition (bL2-z) is preferably 5 to 70% by weight, more preferably 8 to 60% by weight, most preferably 12 to 55% by weight. The solid content can be determined as described in the examples.

The basecoat compositions (bL2a) and (bL2-x) are aqueous and preferably comprise a water fraction of at least 40% by weight, preferably at least 45% by weight, very preferably at least 50% by weight, based in each case on the total amount of the solvents present (i.e., water and organic solvents). Preferably in turn, the water fraction is 40 to 95% by weight, more particularly 45 to 90% by weight, very preferably 50 to 85% by weight, based in each case on the total amount of solvents present.

The basecoat compositions used in accordance with the invention can be produced using the mixing assemblies and mixing techniques that are customary and known for the production of basecoat materials.

The basecoat layer(s) (BL2a) or (BL2-x) are cured together with the clearcoat layer. In particular, the coating compositions as used in step (2) of the method of the invention are not cured separately. The basecoat layers (BL2a) or (BL2-x) are therefore preferably not exposed to temperatures of above 100° C. for a time of longer than 1 minute, and with particular preference are not exposed at all to temperatures of more than 100° C.

The basecoat materials (bL2a) and (bL2-x) are applied such that, after the curing in step (4), the basecoat layer (BL2a) or the individual basecoat layers (BL2-x) each have a film thickness of, for example, 5 to 50 µm, preferably 6 to 40 µm, especially preferably 7 to 35 µm. In step (2)(a), preference is given to producing basecoat layers (BL2a) having relatively high film thicknesses of 15 to 50 µm, preferably 15 to 45 µm. In step (2)(b), the individual basecoat layers (BL2-x) tend to have film thicknesses which are lower by comparison, with the overall system then again having film thicknesses which lie within the order of magnitude of the one basecoat layer (BL2a). In the case of two basecoat layers, for example, the first basecoat layer (BL2-a) preferably has film thicknesses of 5 to 35 µm, more particularly 10 to 30 µm, the second basecoat layer (BL2-z) preferably has film thicknesses of 5 to 35 µm, more particularly 10 to m, and the overall film thickness does usually not exceed 50 µm.

Step (3):

In step (3) of the method of the invention, a clearcoat layer (K) is produced directly on the basecoat layer (BL2a) or on the topmost basecoat layer (BL2-z). This production is accomplished by corresponding application of a clearcoat material (k). Suitable clearcoat materials are described for example in WO 2006042585 A1, WO 2009077182 A1 or else WO 2008074490 A1.

The clearcoat material (k) or the corresponding clearcoat layer (K), following application, is flashed and/or interim-dried preferably at 15 to 35° C. for a time of 0.5 to 30 minutes.

The clearcoat material (k) is applied in such a way that the film thickness of the clearcoat layer after the curing in step (4) is from, for example, 15 to 80 µm, preferably 20 to 65 µm, especially preferably 25 to 60 µm.

Step (4):

In step (4) of the method of the invention, there is joint curing of the basecoat layer (BL2a) and of the clearcoat layer (K), or of the basecoat layers (BL2-x) and of the clearcoat layer (K).

The joint curing takes place preferably at temperatures of 60 to 250° C., preferably 80 to 200° C., more preferably 80 to 160° C., for a duration of 5 to 60 minutes.

The method of the invention allows the production of multicoat paint systems on substrates without a separate curing step. Nevertheless, the multicoat paint systems resulting from application of the method of the invention have good optical and mechanical properties. If the inventive coating composition is used in combination with a subsequently applied coating composition comprising metal effect pigments, the flop effect of the metal effect pigment comprising coating layer can be increased. The increased flop effect in this multicoat paint systems is due to the presence of the polycarboxylic acid PC, the anionically stabilized binder B and optionally the solvent S in the first aqueous basecoat composition (bL2-a) used to produce the first basecoat layer (BL2-a).

As a consequence, metallic effect pigment containing basecoat compositions which are outside of the specification with regard to the flop effect can still be used as coating layer directly on top of a coating layer obtained with the inventive coating composition. The use of the inventive coating composition as first basecoat layer (bL2-a) in the inventive process thus reduces the need to dispose batches of metallic effect pigment containing basecoat compositions which are out of specification with respect to the obtained flop effect. Thus, the inventive process has an increased environmental balance and efficiency.

In respect of further preferred embodiments of the method of the invention, especially in respect of the basecoat compositions used therein and of the components of these basecoat compositions, the statements made in relation to the coating composition of the invention are valid mutatis mutandis.

Multicoat Paint System of the Invention:

After the end of step (4) of the method of the invention, the result is a multicoat paint system (M) of the invention.

In respect of further preferred embodiments of the multicoat paint system of the invention, the comments made regarding the coating composition of the invention and also regarding the method of the invention are valid mutatis mutandis.

The invention is described in particular by the following embodiments:

Embodiment 1: aqueous coating composition comprising—based on the total weight of the coating composition—
  (a) at least one anionically stabilized binder B,
  (b) at least one color pigment P,
  (c) at least one polycarboxylic acid PC, and
  (d) optionally at least one solvent S,
  wherein the coating composition comprises 0 wt. % of effect pigments.

Embodiment 2: aqueous coating composition according to embodiment 1, wherein the at least one anionically stabilized binder B is present in a total amount of 40 to 95 wt. % solids, preferably of 50 to 90 wt. % solids, more particularly of 55 to 85 wt. % solids, based in each case on the total binder content of the coating composition.

Embodiment 3: aqueous coating composition according to embodiment 1 or 2, wherein the at least one anionically stabilized binder B is selected from the group consisting of aqueous polyurethane-polyurea dispersions comprising anionically stabilized polyurethane-polyurea particles (PPP).

Embodiment 4: aqueous coating composition according to embodiment 3, wherein the anionically stabilized polyurethane-polyurea particles (PPP) have an average particle size of 40 to 2,000 nm and a gel fraction of at least 50%, and said polyurethane-polyurea particles (PPP) comprise, each case in reacted form,
(Z.1.1) at least one isocyanate group-containing polyurethane prepolymer containing groups which are anionic and/or can be converted into anionic groups, and
(Z.1.2) at least one polyamine containing two primary amino groups and one or two secondary amino groups.

Embodiment 5: aqueous coating composition according embodiment 3 or 4, wherein the polyurethane-polyurea particles (PPP) have an average particle size of 110 to 500 nm, more particularly of 130 to 250 nm, and/or a gel fraction of 60% to 100%, preferably of 70% to 100%, more particularly of 80% to 100%.

Embodiment 6: aqueous coating composition according to any of the proceeding embodiment 4 or 5, wherein the prepolymer (Z.1.1) comprises carboxylic acid groups.

Embodiment 7: aqueous coating composition according to any of embodiments 4 to 6, wherein the prepolymer (Z.1.1) comprises at least one polyesterdiol, said polyesterdiol is prepared using diols and dicarboxylic acids, with the proviso that at least 50 wt. %, preferably 55 to 75 wt. %, of the dicarboxylic acids are dimer fatty acids.

Embodiment 8: aqueous coating composition according to any of embodiments 4 to 7, wherein the polyamine (Z.1.2) consists of one or two secondary amino groups, two primary amino groups, and aliphatic saturated hydrocarbon groups.

Embodiment 9: aqueous coating composition according to any of embodiments 4 or 8, wherein the at least one polyamine (Z.1.2) is selected from the group consisting of diethylenetriamine, 3-(2-aminoethyl)aminopropylamine, dipropylenetriamine, N1-(2-(4-(2-aminoethyl)pipera-zin-1-yl)ethyl)ethane-1,2-diamine, triethylenetetramine, and N,N'-bis(3-amino-propyl)ethylenediamine, preferably diethylenetriamine.

Embodiment 10: aqueous coating composition according to any of embodiments 3 to 9, wherein the aqueous polyurethane-polyurea dispersion has an electrophoretic mobility at pH 8.0 of −2.5 to −15 (μm/s)/(V/cm), preferably of −2.5 to −10 (μm/s)/(V/cm), more preferably of −4 to −8 (μm/s)/(V/cm), more particularly of −6 to −8 (μm/s)/(V/cm).

Embodiment 11: aqueous coating composition according to any of embodiments 3 to 10, wherein the aqueous polyurethane-polyurea dispersion is present in a total amount of 1 to 60 wt. % solids, preferably of 5 to 50 wt. % solids, more preferably of 10 to 40 wt. % solids, very preferably 15 to 40 wt. % solids, based in each case on the total binder content of the coating composition.

Embodiment 12: aqueous coating composition according to any of the proceeding embodiments, wherein the at least one pigment P is selected from the group consisting of (i) white pigments such as titanium dioxide, zinc white, zinc sulfide or lithopone; (ii) black pigments such as carbon black, iron manganese black, or spinel black; (iii) chromatic pigments such as ultramarine green, ultramarine blue, manganese blue, ultramarine violet, manganese violet, red iron oxide, molybdate red, ultramarine red, brown iron oxide, mixed brown, spinel phases and corundum phases, yellow iron oxide, bismuth vanadate; (iv) organic pigments such as monoazo pigments, bisazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, prinone pigments, perylene pigments, phthalocyanine pigments, aniline black; and (v) mixtures thereof.

Embodiment 13: aqueous coating composition according to any of the proceeding embodiments, wherein the at least one pigment P is present in a total amount of 1 to 40 wt. %, preferably of 2 to 35 wt. %, more preferably of 5 to 30 wt. %, based in each case on the total weight of the coating composition.

Embodiment 14: aqueous coating composition according to any of the proceeding embodiments, wherein the neutralization level of the at least one polycarboxylic acid PC is at least 5%, preferably at least 10%, more preferably from 10 to 100%.

Embodiment 15: aqueous coating composition according to any of the proceeding embodiments, wherein the at least one polycarboxylic acid PC is a dicarboxylic acid.

Embodiment 16: aqueous coating composition according embodiment 15, wherein the dicarboxylic acid has the general formula (I)

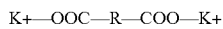

in which
R is a linear or branched saturated $C_4$-$C_{30}$ alkyl group, a linear or branched unsaturated $C_{10}$-$C_{72}$ alkyl group, a cycloalkyl group or an aromatic group, preferably a linear saturated $C_7$ alkyl group, and
K+ is hydrogen or a cation.

Embodiment 17: aqueous coating composition according any of the preceding embodiments, wherein the dicarboxylic acid is selected from the group of azelaic acid, pimelic acid, suberic acid, sebacic acid, dodecandioic acid and phthalic acid and mixtures thereof.

Embodiment 18: aqueous coating composition according to any of the proceeding embodiments, wherein the at least one polycarboxylic acid PC, more particularly the dicarboxylic acid of general formula (I), is present in a total amount of 0.01 to 4 wt. %, more preferably of 0.02 to 2 wt. %, more particularly of 0.05 to 1 wt. %, based in each case on the total weight of the coating composition.

Embodiment 19: aqueous coating composition according to any of the proceeding embodiments, wherein the at least one solvent S is selected from water, alkoxy-$C_2$-$C_{10}$ alcohols, ketones, esters, amides, methylal, butylal, 1,3-dioxolane, glycerol formal, and mixtures thereof, more particularly alkoxy-$C_2$-$C_{10}$ alcohols.

Embodiment 20: aqueous coating composition according to any of the proceeding embodiments, wherein the aqueous coating composition comprises the at least one solvent S, more particularly water and/or alkoxy-$C_2$-$C_{10}$ alcohols, in a total amount of 0.01 to 15 wt. %, preferably of 0.05 to 10 wt. %, more preferably of 0.1 to 5 wt. %, more particularly of 0.2 to 2 wt. %, based in each case on the total weight of the coating composition.

Embodiment 21: aqueous coating composition according to any of the proceeding embodiments, wherein the coating composition additionally comprises at least one neutralizing agent, said neutralizing agent being preferably selected form the group consisting of inorganic bases, primary amines, secondary amines, tertiary amines and mixtures thereof, more particularly N,N'-dimethylethanolamine.

Embodiment 22: aqueous coating composition according to embodiment 20, wherein the at least one neutralizing agent, preferably N,N'-dimethylethanolamine, is present in a total amount of 0.05 to 5 wt. %, preferably of 0.05 to 4 wt. %, more preferably of 0.05 to 1 wt. %, more particularly of 0.05 to 0.2 wt. %, based in each case on the total weight of the coating composition.

Embodiment 23: aqueous coating composition according to any of the proceeding embodiments, wherein the coating composition comprises 0 wt. %, based on the total weight of the coating composition, of phyllosilicates, more particularly sodium magnesium silicates and/or lithium aluminum magnesium silicates, and/or polyamides.

Embodiment 24: aqueous coating composition according to any of the proceeding embodiments, wherein the coating composition additionally comprises at least one crosslinking agent, said crosslinking agent being preferably selected from the group consisting of melamine-formaldehyde resins, free and/or blocked polyisocyanates, polycarbodiimides, and mixtures thereof, more particularly melamine-formaldehyde resins.

Embodiment 25: aqueous coating composition according to embodiment 24, wherein the at least one crosslinking agent, especially melamine-formaldehyde resin, is present in a total amount of 5 to 50 wt. %, preferably of 7 to 45 wt. %, more preferably of 10 to 40 wt. %, based in each case on the total binder content of the coating composition.

Embodiment 26: aqueous coating composition according to any of the proceeding embodiments, wherein the composition has a solids content of 15 to 60 wt. %, based in each case on the total weight of the coating composition and measured according to DIN EN ISO 3251 (June 2008).

Embodiment 27: aqueous coating composition according to any of the proceeding embodiments, has a pH of 7 to 10, more particularly of 7 to 9, measured in each case at 23° C.

Embodiment 28: method for producing an aqueous coating composition, comprising
(1) providing a solution comprising at least one polycarboxylic acid PC, at least one solvent S, and optionally at least one neutralizing agent and
(2) adding the solution provided in step (1) to an aqueous composition comprising at least one anionically stabilized binder B and at least one color pigment P.

Embodiment 29: method for producing a multicoat paint system (M) on a substrate (S), comprising the following steps:
(1) optionally producing a cured first coating layer (S1) on the substrate (S) by application of a composition (Z1) to the substrate (S) and subsequent curing of the applied composition (Z1),
(2) producing a basecoat layer (BL2a) or at least two directly consecutive basecoat layers (BL2-x) directly on the first coating layer (S1) by application of an aqueous basecoat material (bL2a) directly to the first coating layer (S1) or directly consecutive application of at least two aqueous basecoat materials (bL2-x) directly to the first coating layer (S1),
(3) producing a clearcoat layer (C) directly on the basecoat layer (BL2a) or on the topmost basecoat layer (BL2-z) by application of a clearcoat material (cm) directly to the basecoat layer (BL2a) or to the topmost basecoat layer (BL2-z),
(4) jointly curing the basecoat layer (BL2a) and the clearcoat layer (C) or the basecoat layers (BL2-x) and the clearcoat layer (C),
wherein
the at least one basecoat material (bL2a) or at least one of the basecoat materials (bL2-x) comprises a composition according to any of embodiments 1 to 27, and/or the at least one basecoat material (bL2a) or at least one of the basecoat materials (bL2-x) is obtained by the method according to embodiment 28.

Embodiment 30: method according to embodiment 29, wherein the substrate (S) is selected from metallic substrates, metallic substrates coated with a cured electrocoat, plastic substrates, reinforced plastic substrates and substrates comprising metallic and plastic components, especially preferably from metallic substrates.

Embodiment 31: method according to embodiment 29 or 30, wherein the first aqueous basecoat material (bL2-a) comprises a coating composition according to any of embodiments 1 to 27 or a basecoat material (bL2-a) obtained by the method according to embodiment 28 and wherein the second basecoat material (bL2-z) comprises an effect pigment containing basecoat composition.

Embodiment 32: method according to embodiment 31, wherein the aqueous basecoat material (bL2-z) comprises at least one hydroxy-functional polymer as binder, said at least one hydroxy-functional polymer being selected from the group consisting of a polyurethane, a polyester, a polyacrylate, copolymers thereof and mixtures of these polymers.

Embodiment 33: method according to embodiment 31 or 32, wherein the effect pigment is selected from the group consisting of (i) platelet-shaped metal effect pigments such as lamellar aluminum pigments, (ii) gold bronzes; (iii) oxidized bronzes and/or iron oxide-aluminum pigments; (iv) pearlescent pigments such as pearl essence; (v) basic lead carbonate; (vi) bismuth oxide chloride and/or metal oxide-mica pigments; (vii) lamellar pigments such as lamellar graphite, lamellar iron oxide; (viii) multilayer effect pigments composed of PVD films; (ix) liquid crystal polymer pigments; and (x) mixtures thereof.

Embodiment 34: method according to any of embodiments 31 to 33, wherein the effect pigment is present in the aqueous basecoat material (bL2-z) in a total amount 1 to 40% by weight, preferably 2 to 35% by weight, more preferably 5 to 30% by weight, based on the total weight of the aqueous basecoat composition (bL2-z) in each case.

Embodiment 35: method according to any of embodiments 31 to 34, wherein the basecoat material (bL2-z) comprises at least one crosslinking agent selected from the group consisting of blocked polyisocyanates and/or aminoplast resins, preferably aminoplast resins.

Embodiment 36: method according to any of embodiments 29 to 35, wherein the joint curing in step (4) is carried at temperatures of 60 to 250° C., preferably 80 to 200° C., more preferably 80 to 160° C., for a duration of 5 to 60 minutes.

Embodiment 37: multicoat paint system (M) produced by the method according to of any of embodiments 29 to 36.

EXAMPLES

The present invention will now be explained in greater detail through the use of working examples, but the present invention is in no way limited to these working examples. Moreover, the terms "parts", "%" and "ratio" in the examples denote "parts by mass", "mass %" and "mass ratio" respectively unless otherwise indicated.

1. Methods of Determination:
1.1 Solids Content (Solids, Nonvolatile Fraction)

The nonvolatile fraction is determined according to DIN EN ISO 3251 (date: June 2008). It involves weighing out 1 g of sample into an aluminum dish which has been dried beforehand, drying it in a drying oven at 125° C. for 60 minutes, cooling it in a desiccator and then reweighing it.

The residue relative to the total amount of sample used corresponds to the nonvolatile fraction. The volume of the nonvolatile fraction may optionally be determined if necessary according to DIN 53219 (date: August 2009).

1.2 Particle Size

The average particle size is determined by dynamic light scattering (photon correlation spectroscopy (PCS)) in accordance with DIN ISO 13321 (Date: October 2004). By average particle size here is meant the measured mean particle diameter (Z-average mean). The measurement uses a Malvern Nano S90 (from Malvern Instruments) at 25±1° C. The instrument covers a size range from 3 to 3000 nm and is equipped with a 4 mW He—Ne laser at 633 nm. The respective samples are diluted with particle-free deionized water as dispersing medium and then subjected to measurement in a 1 ml polystyrene cell at suitable scattering intensity. Evaluation took place using a digital correlator, with the assistance of the Zetasizer analysis software, version 7.11 (from Malvern Instruments). Measurement takes place five times, and the measurements are repeated on a second, freshly prepared sample. The average particle size refers to the arithmetic mean of the average particle size (volume average). The standard deviation of a 5-fold determination here is <4%.

1.3 Determination of Acid Number

The acid number is determined according to DIN EN ISO 2114 (date: June 2002), using "method A". The acid number corresponds to the mass of potassium hydroxide in mg which is needed to neutralize 1 g of sample under the conditions stipulated in DIN EN ISO 2114. The reported acid number corresponds here to the total acid number indicated in the DIN standard, and is based on the solids content.

1.4 Determination of OH Number

The OH number is determined according to DIN 53240-2 (date: November 2007). In this method, the OH groups are reacted by acetylation with an excess of acetic anhydride. The excess acetic anhydride is subsequently cleaved to form acetic acid by addition of water, and the total acetic acid is back-titrated with ethanolic KOH. The OH number indicates the amount of KOH in mg (based on the solid) which is equivalent to the amount of acetic acid bound in the acetylation of 1 g of sample.

1.5 Determination of Number-Average and Weight-Average Molecular Weight

The number-average molecular weight (Mn) is determined by gel permeation chromatography (GPC) according to DIN 55672-1 (date: August 2007). Besides the number-average molecular weight, this method can also be used, moreover, for determining the weight-average molecular weight (Mw) and also the polydispersity d (ratio of weight-average molecular weight (Mw) to number-average molecular weight (Mn)). Tetrahydrofuran is used as eluent. The determination is made against polystyrene standards. The column material consists of styrene-divinylbenzene copolymers.

1.6 Determination of Gel Fraction of the Polyurethane-Polyurea Particles (PPP)

The gel fraction of the polyurethane-polyurea particles (PPP) is determined gravimetrically in the context of the present invention. Here, first of all, the polymer present was isolated from a sample of an aqueous dispersion (initial mass 1.0 g) by freeze-drying. Following determination of the solidification temperature—the temperature above which the electrical resistance of the sample shows no further change when the temperature is lowered further—the fully frozen sample underwent its main drying, customarily in the drying vacuum pressure range between 5 mbar and 0.05 mbar, at a drying temperature lower by 10° C. than the solidification temperature. By graduated increase in the temperature of the heated surfaces beneath the polymers to 25° C., rapid freeze-drying of the polymers was achieved, after a drying time of typically 12 hours, the amount of isolated polymer (solid fraction, determined via freeze-drying) was constant and no longer underwent any change even on prolonged freeze-drying. Subsequent drying at a temperature of 30° C. of the surface beneath the polymer, with the ambient pressure reduced to the maximum degree (typically between 0.05 and 0.03 mbar), produced optimum drying of the polymer.

The isolated polymer was subsequently sintered in a forced air oven at 130° C. for 1 minute and thereafter extracted for 24 hours at 25° C. in an excess of tetrahydrofuran (ratio of tetrahydrofuran to solid fraction=300:1). The insoluble fraction of the isolated polymer (gel fraction) was then separated off on a suitable frit, dried in a forced air oven at 50° C. for 4 hours, and subsequently reweighed.

It was further ascertained that at the sintering temperature of 130° C., with variation in the sintering times between one minute and twenty minutes, the gel fraction found for the particles is independent of the sintering time. It can therefore be ruled out that crosslinking reactions subsequent to the isolation of the polymeric solid increase the gel fraction further.

The gel fraction determined in this way in accordance with the invention is also called gel fraction (freeze-dried).

In parallel a gel fraction, also referred to below as gel fraction (130° C.), was determined gravimetrically by isolating a polymer sample from aqueous dispersion (initial mass 1.0 g) at 130° C. for 60 minutes (solids content). The mass of the polymer was determined, after which the polymer, in analogy to the procedure described above, was extracted in an excess of tetrahydrofuran at 25° C. for 24 hours, the insoluble fraction (gel fraction) was separated off and dried and reweighed.

1.7 Solubility in Water

The solubility of an organic solvent in water at 20° C. was determined as follows. The organic solvent in question and water were combined in a suitable glass vessel and mixed, and the mixture was subsequently equilibrated. The quantities selected here for water and for the solvent were such that the equilibration produced two phases separate from one another. After the equilibration, a syringe is used to take a sample of the aqueous phase (that is, the phase which contains more water than organic solvent), and this sample is diluted in a ratio of 1/10 with tetrahydrofuran and subjected to gas chromatography to ascertain the fraction of the solvent (for conditions see Section 8. Solvent content).

If two phases do not form, irrespective of the amounts of water and the solvent, the solvent is miscible with water in any weight ratio. This therefore infinitely water-soluble solvent (acetone, for example) is therefore at any rate not a solvent (Z.2).

1.8 Determination of the Surface Charges by Means of Electrophoresis

The surface charges were determined by measurements with the Zetasizer Nano from Malvern in the pH range from 3 to 10. The measurements were started at the pH of the samples after dilution. The pH was adjusted using HCl and/or NaOH. The samples were measured in 10 mmol/l KCl.

1.9 Degree of Neutralization

The degree of neutralization of a component x was calculated from the amount-of-substance of the carboxylic acid groups present in the component (determined via the acid number) and from the amount of the neutralizing agent used.

1.10 Production of Multicoat Paint Systems

Test panels of galvanized rolled steel were coated with a cathodic electrodeposition coat (CathoGuard® CG 800, BASF Coatings GmbH) and cured at 180° C. for 22 minutes. The resulting dry film thickness of the obtained cured electrocoating layer was 18 μm.

On these panels, the respective aqueous basecoat material (BC-C1) to (BC-C8) and (BC-I1) to (BC-I8) is applied electrostatically and dried for 4 minutes at 23° C. to obtain a first basecoat layer (BL2-a) in a dry film thickness of 18 μm.

Afterwards, an aqueous basecoat material (BC-E1) or (BC-E2) containing effect pigments is applied in a bell-bell-process using two subsequent electrostatic applications such that the resulting dry film thickness of the second basecoat layer (BL2-z) is 12 to 14 μm. The basecoat material (BC-E1) or (BC-E2) was flashed for 1 minute at 23° C. and dried for 10 minutes at 70° C.

After the basecoat material has been dried, a commercial clearcoat material (2K clearcoat material Igloss®, supplied by BASF Coatings GmbH) was applied pneumatically such that the resulting dry film thickness is 40 μm. The clear coat layer was flashed for 20 minutes at 23° C. and the obtained multicoat system was subsequently cured at 140° C. for 20 minutes.

1.11 Determination of Dry Film Thicknesses

The film thicknesses are determined according to DIN EN ISO 2808 (date: May 2007), method 12A, using the MiniTest® 3100-4100 instrument from ElektroPhysik.

1.12 Determination of Angle-Dependent Lightness

For determining the lightness, a coated substrate (i.e. multicoat system described in point 1.10) is subjected to measurement using a spectrophotometer (e.g. X-Rite MA60B+BA Multi-Angle Spectrophotometer). The surface is illuminated with a light source. At various angles, spectral detection is carried out in the visible range. The spectral measurements obtained in this way can be used, taking account of the standardized spectral values and also the reflection spectrum of the light source used, to calculate color values in the CIEL*a*b* color space, where L* characterizes the lightness, a* the red-green value, and b* the yellow-blue value.

The non-inventive multicoat paint systems comprising $BC-C_1$ or $BC-C_3$ as first basecoat layer (BL2-a) and BC-E1 or BC-E2 as second basecoat layer (BL2-z) were used as reference to calculate the difference in lightness (ΔL), red-green value (Δa) and yellow-blue value (Δb).

2. Preparation of Aqueous Basecoat Materials

The following should be taken into account regarding the formulation constituents and amounts thereof as indicted in the tables hereinafter. When reference is made to a commercial product or to a preparation protocol described elsewhere, the reference, independently of the principal designation selected for the constituent in question, is precisely this commercial product or precisely the product prepared with the referenced protocol.

Accordingly, where a formulation constituent possesses the principal designation "melamine-formaldehyde resin" and where a commercial product is indicated for this constituent, the melamine-formaldehyde resin is used in the form of precisely this commercial product. Any further constituents present in the commercial product, such as solvents, must therefore be taken into account, if conclusions are to be drawn about the amount of the active substance (of the melamine-formaldehyde resin).

If, therefore, reference is made to a preparation protocol for a formulation constituent, and if such preparation results, for example, in a polymer dispersion having a defined solids content, then precisely this dispersion is used. The overriding factor is not whether the principal designation that has been selected is the term "polymer dispersion" or merely the active substance, for example, "polymer", "polyester", or "polyurethane-modified polyacrylate". This must be taken into account, if conclusions are to be drawn concerning the amount of the active substance (of the polymer).

2.1 Preparation of Aqueous Dispersion of Anionically Stabilized Polyurethane-Polyurea Particles (D1)

The aqueous dispersion of anionically stabilized polyurethane-polyurea particles (D1) was prepared as per preparation example "PD1" on pages 75 and 76 of WO 2018/011311 A1. The dispersion has an electrophoretic mobility of −6.7 (μ/s)/(V/cm) at a pH of 8.0 (for measurement see point 1.8 above).

2.2 Preparation of Color Pastes and Mica Slurry 2.2.1 Preparation of White Paste P1

The white paste P1 is prepared from 50 parts by weight of Titan Rutil R-960-38, 11 parts by weight of a polyester prepared according to example D, column 16, lines 37-59 of DE A 40 09 858 A1, 16 parts by weight of a binder dispersion prepared according to page 8, lines 6 to 18 of patent EP 0 228 003 B2, 1.5 parts by weight of Pluriol® P900 (BASF SE), 17 parts by weight of deionized water, 1.5 parts by weight of an aqueous N,N'-dimethylethanolamine solution (10 wt. % in deionized water) and 3 parts by weight of butyl glycol.

2.2.2 Preparation of Carbon Black Paste P2

The carbon black paste P2 is prepared from 10.1 parts by weight of carbon black FW 2, 5 part by weight of a polyester prepared according example D, column 16, lines 37-59 of DE A 40 09 858 A1, 58.9 parts by weight of a binder dispersion prepared according to page 14, line 13 to page 15, line 13 of patent application WO 92/15405, 2.2 parts by weight of Pluriol® P900 (BASF SE), 8.4 parts by weight of deionized water, 7.8 parts by weight of an aqueous N,N'-dimethylethanolamine solution (10 wt. % in deionized water) and 7.6 parts by weight of butyl glycol.

2.2.3 Preparation of Yellow Paste P3

The yellow paste P3 is prepared from 17.3 parts by weight of Sicotrans-Gelb L 1916, 18.3 parts by weight of a polyester prepared according to example D, column 16, lines 37-59 of DE 40 09 858 A1, 43.6 parts by weight of a binder dispersion prepared according to page 8, lines 6 to 18 of patent EP 022 8003 B2, 16.5 parts by weight of deionized water and 4.3 parts by weight of butyl diglycol.

2.2.4 Preparation of Red Paste P4

The red paste P4 is prepared from 49.7 parts by weight of an acrylated polyurethane 25 dispersion prepared according to "Bindemitteldispersion A" (polymer A) of patent application WO 91/15528, 12 parts by weight of Sicotrans® red (BASF SE), 3 parts by weight of Pluriol® P900 (BASF SE), 2 parts by weight of butyl glycol, 1 part by weight of an aqueous N,N'-dimethylethanolamine solution (10 wt. % in deionized water) and 32.3 parts by weight of deionized water.

2.2.4 Preparation of Blue Paste P5

The blue paste P5 is prepared from 69.8 parts by weight of an acrylated polyurethane dispersion prepared according to "Bindemitteldispersion A" (polymer A) of patent application WO 91/15528, 12.5 parts by weight of Paliogen Blue L 6482 (BASF SE), 1.2 parts by weight of Pluriol® P900

(BASF SE), 1.5 parts by weight of an aqueous N,N'-dimethylethanolamine solution (10 wt. % in deionized water) and 15 parts by weight of deionized water.

2.2.5 Preparation of Mica Slurry MI1

The mica slurry was prepared by mixing 1.5 parts by weight butyl glycol, 1.5 parts by weight of a polyester prepared according to example D, column 16, lines 37-59 of DE 4 009 858 A and 1.3 parts by weight of Mica Mearlin ext. Super Orange 339Z (Merck KGaA) with a stirring device.

2.2.6 Preparation of Mica Slurry MI2

The mica slurry was prepared by mixing 1.5 parts by weight butyl glycol, 1.5 parts by weight of a polyester prepared according to example D, column 16, lines 37-59 of DE 4 009 858 A and 1.3 parts by weight of Iriodin 9225 SQB (Merck KGaA) with a stirring device.

2.3 Preparation of Solutions (SOL1) to (SOL11) of Different Carboxylic Acids in a Solvent S The solutions SOL1 to SOL11 were prepared by mixing the respective amounts of carboxylic acid, neutralizing agent and solvent S as listed in Table 1.

TABLE 1

| | | SOL1 | SOL2 | SOL3 | SOL4 | SOL5 | SOL6 | SOL7 | SOL8 | SOL9 | SOL10 | SOL11 |
|---|---|---|---|---|---|---|---|---|---|---|---|---|
| Polycarboxylic acid PC | Azelaic acid | 12.5 | 12.5 | — | — | — | — | — | — | — | — | — |
| | Pimelic acid | — | — | 10.6 | — | — | — | — | — | — | — | — |
| | Suberic acid | — | — | — | 11.6 | — | — | — | — | — | — | — |
| | Sebacic acid | — | — | — | — | 13.4 | — | — | — | — | — | — |
| | Dodecandioic acid | — | — | — | — | — | 15.3 | — | — | — | — | — |
| | Phthalic acid | — | — | — | — | — | — | 9.8 | — | — | — | — |
| Monocarboxylic acid | Palmitic acid | — | — | — | — | — | — | — | 34.0 | — | — | — |
| | Oleic acid | — | — | — | — | — | — | — | — | 37.5 | — | — |
| | Pelargonic acid | — | — | — | — | — | — | — | — | — | 21.0 | — |
| | Stearic acid | — | — | — | — | — | — | — | — | — | — | 37.8 |
| | Neutralizing agent [1] | 12.5 | 12.5 | 12.5 | 12.5 | 12.5 | 12.5 | 12.5 | 12.5 | 12.5 | 12.5 | 12.5 |
| Solvent S | 1-Methoxy-2-propanol | 75 | — | — | — | — | — | — | — | — | — | — |
| | Water | — | 75 | 76.9 | 75.9 | 74.1 | 72.2 | 77.7 | 53.5 | 50.0 | 66.5 | 49.7 |

[1] 10 wt. % N,N'-dimethylethanolamine in water 2.4 Production of aqueous basecoat materials BC-C1 to BC-C7 (comparative)

The aqueous basecoat materials BC-C1 to BC-C7 were produced by mixing the compounds listed in Table 2 in the stated order. After stirring for 10 minutes, the mixture is subsequently adjusted using deionized water and N,N'-dimethylethanolamine to a pH of 8.0 and to a spray viscosity of 85 mPa*s under a shear number of 1000 s$^{-1}$ as measured using a rotary viscometer (Rheolab QC instrument with C-LTD80/QC conditioning system, from Anton Paar) at 23° C. BC-C1 to BC-C3 do not contain any di- or monocarboxylic acids. BC-C4 to BC-C7 each contain different monocarboxylic acids.

TABLE 2

Compounds of aqueous materials BC-C1 to BC-C7

| | BC-C1 | BC-C2 | BC-C3 | BC-C4 | BC-C5 | BC-C6 | BC-C7 |
|---|---|---|---|---|---|---|---|
| White paste P1 (see point 2.2.1 above) | 45 | 45 | 45 | 45 | 45 | 45 | 45 |
| Carbon black paste P2 (see point 2.2.2 above) | 1.4 | 1.4 | 1.4 | 1.4 | 1.4 | 1.4 | 1.4 |
| Yellow paste P3 (see point 2.2.3 above) | 1.8 | 1.8 | 1.8 | 1.8 | 1.8 | 1.8 | 1.8 |
| Aqueous dispersion D1 (see point 2.1 above) | 19.3 | 19.3 | 19.3 | 19.3 | 19.3 | 19.3 | 19.3 |
| Daotan TW 6464/36 WA (supplied by Allnex) | 7.7 | 7.7 | — | — | — | — | — |
| Parocryl 566059 [1] | — | — | 9.6 | 9.6 | 9.6 | 9.6 | 9.6 |
| 2-ethylhexanol | 1.8 | 1.8 | 1.8 | 1.8 | 1.8 | 1.8 | 1.8 |
| Resimene ® HM-2608 (supplied by Ineos) | 2.9 | 2.9 | 2.9 | 2.9 | 2.9 | 2.9 | 2.9 |
| Resimene ® CE-2608 (supplied by Ineos) | 5.5 | 5.5 | 5.5 | 5.5 | 5.5 | 5.5 | 5.5 |
| Polyester [2] | — | — | 1.0 | 1.0 | 1.0 | 1.0 | 1.0 |
| Aqueous dimethylethanolamine (10% in deionized water) | 1.0 | 1.0 | 1.0 | 1.0 | 1.0 | 1.0 | 1.0 |
| aqueous Adekanol ® UH-756VF (supplied by Adeka) (33.3% in deionized water) | 0.5 | — | 0.25 | 0.25 | 0.25 | 0.25 | 0.25 |
| Triisobutylphosphat | 1.0 | 1.0 | — | — | — | — | — |
| Isopar ® L (supplied Exxon Mobile) | 2.3 | 2.3 | 5.0 | 5.0 | 5.0 | 5.0 | 5.0 |
| Isotridecylalcohol | 1.8 | 1.8 | — | — | — | — | — |
| N-butoxypropanol | — | — | 2.0 | 2.0 | 2.0 | 2.0 | 2.0 |
| Deionized water | — | 0.5 | 1.0 | 3.0 | 2.5 | 2.0 | 1.5 |

TABLE 2-continued

Compounds of aqueous materials BC-C1 to BC-C7

| | BC-C1 | BC-C2 | BC-C3 | BC-C4 | BC-C5 | BC-C6 | BC-C7 |
|---|---|---|---|---|---|---|---|
| SOL8 (contains palmitic acid) | — | — | — | 0.99 | — | — | — |
| SOL9 (contains oleic acid) | — | — | — | — | 1.5 | — | — |
| SOL10 (contains pelargonic acid) | — | — | — | — | — | 0.5 | — |
| SOL11 (contains stearic acid) | — | — | — | — | — | — | 2.25 |

[1] prepared according to WO 2016/116299, page 45, example BM2
[2] prepared according to WO 2014/033135 A1, page 28 lines 13 to 33, example BE1

2.5 Production of Aqueous Basecoat Materials BC-I1 to BC-I8 (Inventive)

The inventive aqueous coating materials BC-I1 to BC-I8 were prepared by adding the respective amount of the polycarboxylic acid solution SOL1 to SOL7 prepared according to point 2.3 to the respective amount of comparative aqueous basecoat materials BC-C1 to BC-C3 under stirring (see Table 3).

TABLE 3

Compounds of inventive aqueous basecoat materials BC-I3 to BC-I8 (amounts in % by weight)

| | BC-I1 | BC-I2 | BC-I3 | BC-I4 | BC-I5 | BC-I6 | BC-I7 | BC-I8 |
|---|---|---|---|---|---|---|---|---|
| Aqueous basecoat material BC-C1 | 97.7 | — | — | — | — | — | — | — |
| Aqueous basecoat material BC-C2 | — | 99.5 | — | — | — | — | — | — |
| Aqueous basecoat material BC-C3 | — | — | 100 | 100 | 100 | 100 | 100 | 100 |
| SOL1 (azelaic acid + 1-methoxy-2-propanol) | 2.3 | — | 0.5 | — | — | — | — | — |
| SOL2 (azelaic acid + water) | — | 0.5 | — | — | — | — | — | — |
| SOL3 (pimelic acid + water) | — | — | — | 0.5 | — | — | — | — |
| SOL4 (suberic acid + water) | — | — | — | — | 0.5 | — | — | — |
| SOL5 (sebacic acid + water) | — | — | — | — | — | 0.5 | — | — |
| SOL6 (dodecanoic acid + water) | — | — | — | — | — | — | 0.5 | — |
| SOL7 (phthalic acid + water) | — | — | — | — | — | — | — | 0.5 |

2.6 Production of Aqueous Basecoat Materials BC-E1 and BC-E2 Comprising Effect Pigments The compounds listed in Table 4 under "aqueous phase" were mixed in the stated order to obtain an aqueous mixture. Additionally, the compounds listed in Table 2 under "organic phase" were mixed in the stated order to obtain an organic mixture. The organic mixture was added to the aqueous mixture while stirring and stirring was continued for 10 minutes. The mixture is subsequently adjusted using deionized water and N,N'-dimethylethanolamine to a pH of 8.0 and to a spray viscosity of 65 mPa*s under a shearing load of 1000 $s^{-1}$ as measured using a rotary viscometer (Rheolab QC instrument with C-LTD80/QC conditioning system, from Anton Paar or Rheomat RM 180 from Mettler-Toledo) at 23° C.

TABLE 4

Compounds of aqueous basecoat material BC-E (amounts in % by weight)

| | | BC-E1 | BC-E2 |
|---|---|---|---|
| Aqueous phase | 3% Na-Mg phyllosilicate solution | 20.9 | 23 |
| | Polyurethane dispersion [1] | 26.5 | 24 |
| | Deionized water | 17.9 | 16.16 |
| | Butyl glycol | 1.56 | 1.5 |
| | Maprenal ® MF909 (supplied by Allnex) | 5.0 | 4.5 |
| | Polyester [2] | 2.08 | — |
| | Polyurethane modified polyacrylate [3] | 4.2 | 4.5 |
| | Pluriol ® P900 (supplied by BASF SE) | 0.9 | 1.0 |
| | 2-Ethylhexanol | 1.5 | 1.6 |
| | Byk ®-346 (supplied by Altana) | 0.25 | — |
| | TMDD (supplied by BASF SE) | 1.5 | 1.35 |
| | Nacure ® 2500 (supplied by King Industries) | 0.7 | — |
| | Rheovis ® PU 1250 (50% solution) (supplied by BASF SE) | 0.2 | 0.5 |
| | Rheovis ® AS S130 (3% in water (supplied by BASF SE)) | — | 4.0 |
| | Carbon black paste P2 (see point 2.2.2 above) | 0.9 | — |
| | Red paste P4 (see point 2.2.4 above) | 0.17 | — |
| | Yellow paste P3 (see point 2.2.3 above) | 0.07 | — |
| | Blue paste P5 (see point 2.2.5 above) | — | 0.29 |
| | Aqueous dimethylethanolamine (10% in deionized water) | 1.3 | 1.0 |
| | Mica slurry MI1 (see point 2.2.6 above) | 2.7 | — |
| | Mica slurry MI2 (see point 2.2.7 above) | — | 0.8 |
| | Tributylphosphate (supplied by Lanxess) | — | 2.0 |

TABLE 4-continued

Compounds of aqueous basecoat material BC-E
(amounts in % by weight)

| | | BC-E1 | BC-E2 |
|---|---|---|---|
| Organic phase | Aluminum effect pigment (supplied by Altana-Eckart) | 3.42 | 4.6 |
| | Butyl glycol | 3.99 | 4.6 |
| | Polyester [2] | 4.26 | 4.6 |

[1] prepared according to WO 92/15405 (page 14, line 13 to page 15, line 28),
[2] prepared according to example D, column 16, lines 37-59 of DE 4 009 858 A
[3] prepared according to page 7, line 55 to page 8, line 23 of DE 4 437 535 A1

3. Viscosity Measurements

The influence of the addition of the polycarboxylic acid (azelaic acid) on the viscosity of the aqueous coating materials can be determined by oscillating viscosity measurements using a Haake® Rheostress device as follows:

0.5 ml of the respective aqueous coating material were added onto the measuring plate of the device and sheared for 5 minutes with a shear stress of 1000 $s^{-1}$. Afterwards, the shear stress is reduced to 1 $s^{-1}$ and the course of the sol-curve is measured against time. Important parameters are the values obtained 1 and 8 minutes after reducing the shear stress to 1 $s^{-1}$.

The obtained results as well as the solid contents of the aqueous basecoat materials are shown in Table 5.

TABLE 5 viscosity of prepared aqueous basecoat materials

| Aqueous basecoat material | Viscosity @ 1000 $s^{-1}$ | Viscosity @ 1 $s^{-1}$ |
|---|---|---|
| BC-C1 (comparative) | 89 mPa * s | 864 mPa * s |
| BC-I1 (inventive) | 76 mPa * s | 2991 mPa * s |
| BC-I2 (inventive) | 100 mPa * s | 1686 mPa * s |
| BC-C3 (comparative) | 79 mPa * s | 833 mPa * s |
| BC-C4 (comparative) | 81 mPa * s | 1025 mPa * s |
| BC-C5 (comparative) | 82 mPa * s | 916 mPa * s |
| BC-C6 (comparative) | 83 mPa * s | 1193 mPa * s |
| BC-C7 (comparative) | 84 mPa * s | 943 mPa * s |
| BC-I3 (inventive) | 77 mPa * s | 1291 mPa * s |
| BC-I4 (inventive) | 77 mPa * s | 1277 mPa * s |
| BC-I5 (inventive) | 80 mPa * s | 1552 mPa * s |
| BC-I6 (inventive) | 79 mPa * s | 1530 mPa * s |
| BC-I7 (inventive) | 85 mPa * s | 1790 mPa * s |
| BC-I8 (inventive) | 86 mPa * s | 1833 mPa * s |

The addition of a solution of a polycarboxylic acid in a solvent S (azelaic acid (BC-I1, BC-I2, BC-I3), pimelic acid (BC-I4), suberic acid (BC-I5), sebacic acid (BC-I6), dodecandioic acid (BC-I7) and phthalic acid (BC-I8)) to an aqueous basecoat composition comprising at least one anionically stabilized binder B and a color pigment P leads to a significantly increased viscosity after reducing the shear stress to 1 $s^{-1}$ as compared to aqueous basecoat compositions not comprising a polycarboxylic acid PC (BC-C1 to BC-C3) or aqueous basecoat compositions comprising monocarboxylic acids (BC-C4 to BC-C7). At the same time, the spray viscosity at 1000 $s^{-1}$ remains virtually unchanged, thus resulting in good application properties of the inventive coating materials. Due to this significant increase in viscosity, the inventive aqueous coating materials BC-I1 to BC-I8 have better leveling properties than the comparative coating materials (BC-C1 to BC-C3) not comprising any polycarboxylic acid or comparative coating materials (BC-C4 to BC-C7) comprising monocarboxylic acids.

4. Lightness Measurements

The lightness of the multicoat paint systems prepared according to point 1.10 was measured as described in point 1.12.

4.1 Multilayer Coatings Comprising BC-E1 as Second Metallic Coating Layer (BL2-z)

The obtained weighted color values of inventive multicoat paint systems relative to the reference (multicoat paint system comprising BC-C1 or BC-C2 as first basecoat layer (BL2-a) and BC-E1 as second basecoat layer (BL2-z)) are stated in Table 6.

TABLE 6 lightness measurements of multicoat paint systems

| Basecoat sequence | angle | ΔL | Δa | Δb |
|---|---|---|---|---|
| BC-I1 -> BC-E1 | 15° | 2.54 | −0.12 | 0.5 |
| | 25° | 1.87 | −0.11 | 0.27 |
| | 45° | 0.12 | −0.14 | 0 |
| | 75° | −0.55 | −0.16 | −0.17 |
| BC-I2 -> BC-E1 | 15° | 3.75 | 0.03 | 0.15 |
| | 25° | 1.52 | −0.02 | −0.05 |
| | 45° | −1.0 | −0.09 | −0.18 |
| | 75° | −1.38 | −0.06 | −0.14 |

The addition of a solution of polycarboxylic acid (azelaic acid) in a solvent S to an aqueous basecoat composition comprising at least one anionically stabilized binder B and color pigment P (BC-I1 and BC-I2) leads to a significant increased flop effect of the directly overlying metallic effect pigment containing basecoat layer because of the large positive ΔL values obtained at the measurement angles of 15 and 25° as compared to a multicoat paint system where no polycarboxylic acid is used in the first basecoat layer (BC-C1 or BC-C2).

4.2 Multilayer Coatings Comprising BC-E2 as Second Metallic Coating Layer (BL2-z)

The obtained weighted color values of inventive multicoat paint systems relative to the reference (multicoat paint system comprising BC-C3 as first basecoat layer (BL2-a) and BC-E2 as second basecoat layer (BL2-z)) are stated in Table 7.

TABLE 7 lightness measurements of multicoat paint systems

| Basecoat sequence | angle | ΔL | Δa | Δb |
|---|---|---|---|---|
| BC-I3 -> BC-E2 | 15° | 0.57 | 0.03 | 0 |
| | 25° | 0.33 | 0.04 | 0.02 |
| | 45° | −0.1 | 0.01 | 0 |
| | 75° | −0.42 | 0.02 | −0.01 |
| BC-I4 -> BC-E2 | 15° | 0.45 | 0.05 | 0.04 |
| | 25° | 0.19 | 0.03 | 0.02 |
| | 45° | −0.26 | 0.01 | −0.01 |
| | 75° | −0.48 | 0.01 | −0.04 |
| BC-I5 -> BC-E2 | 15° | 0.92 | 0.03 | 0 |
| | 25° | 0.27 | 0.03 | 0.02 |
| | 45° | −0.46 | 0.01 | 0.01 |
| | 75° | −0.64 | 0.01 | −0.01 |
| BC-I6 -> BC-E2 | 15° | 0.81 | 0.01 | 0.03 |
| | 25° | 0.46 | 0.01 | 0.02 |
| | 45° | −0.29 | 0 | 0.01 |
| | 75° | −0.53 | 0.01 | −0.01 |
| BC-I7 -> BC-E2 | 15° | 0.89 | 0.05 | 0 |
| | 25° | 0.46 | 0.02 | 0.02 |
| | 45° | −0.35 | 0.01 | −0.01 |
| | 75° | −0.6 | 0.03 | −0.01 |
| BC-I8 -> BC-E2 | 15° | 0.99 | 0.06 | −0.02 |
| | 25° | 0.39 | 0.03 | −0.02 |
| | 45° | −0.5 | 0.02 | −0.01 |
| | 75° | −0.59 | 0.01 | 0.02 |

TABLE 7-continued lightness measurements of multicoat paint systems

| Basecoat sequence | angle | ΔL | Δa | Δb |
|---|---|---|---|---|
| BC-C4 -> BC-E2 | 15° | −0.27 | 0 | 0.03 |
|  | 25° | −0.13 | 0 | 0 |
|  | 45° | 0.04 | 0 | −0.06 |
|  | 75° | 0.03 | 0 | −0.05 |
| BC-C5 -> BC-E2 | 15° | −0.5 | −0.01 | 0.07 |
|  | 25° | −0.16 | 0 | 0.05 |
|  | 45° | 0.11 | 0 | −0.01 |
|  | 75° | 0.03 | 0 | −0.04 |
| BC-C6 -> BC-E2 | 15° | −0.03 | 0.02 | −0.04 |
|  | 25° | −0.01 | 0.01 | 0.01 |
|  | 45° | −0.12 | 0.02 | 0.01 |
|  | 75° | −0.02 | 0 | 0 |
| BC-C7 -> BC-E2 | 15° | 0.41 | 0.04 | 0.02 |
|  | 25° | 0.16 | 0 | 0.03 |
|  | 45° | −0.12 | 0 | 0.02 |
|  | 75° | −0.03 | −0.01 | 0 |

The addition of a solution of different polycarboxylic acids (azelaic acid, pimelic acid, suberic acid, sebacic acid, dodecandioic acid and phthalic acid) in a solvent S to an S aqueous basecoat composition comprising at least one anionically stabilized binder B and color pigment P (BC-I3 and BC-I8) leads to an increased flop effect of the directly overlying metallic effect pigment containing basecoat layer because of the positive ΔL values obtained at the measurement angle of 15° as compared to a multicoat paint system where no polycarboxylic acid is used in the first basecoat layer (BC-C3). Additionally, no significant flop effect is obtained when comparative basecoat compositions (BC-C4 to BC-C7) containing monocarboxylic acids are used, because no positive ΔL values at 15° are obtained.

The invention claimed is:

1. An aqueous coating composition comprising:
    (a) at least one anionically stabilized binder B,
    (b) at least one color pigment P,
    (c) at least one polycarboxylic acid PC, and
    (d) optionally at least one solvent S,
    wherein the coating composition comprises 0 wt. % of effect pigments based on the total weight of the coating composition, and
    wherein the at least one polycarboxylic acid PC is a dicarboxylic acid.

2. The aqueous coating composition according to claim 1, wherein the at least one anionically stabilized binder B is present in a total amount of 40 to 95 wt. % solids based on the total binder content of the coating composition.

3. The aqueous coating composition according to claim 1, wherein the at least one anionically stabilized binder B is selected from the group consisting of aqueous polyurethane-polyurea dispersions comprising anionically stabilized polyurethane-polyurea particles (PPP).

4. The aqueous coating composition according to claim 3, wherein the anionically stabilized polyurethane-polyurea particles (PPP) have an average particle size of 40 to 2,000 nm and a gel fraction of at least 50%, and said polyurethane-polyurea particles (PPP) comprise, each case in reacted form,
    (Z.1.1) at least one isocyanate group-containing polyurethane prepolymer containing groups which are anionic and/or can be converted into anionic groups, and
    (Z.1.2) at least one polyamine containing two primary amino groups and one or two secondary amino groups.

5. The aqueous coating composition according to claim 3, wherein the aqueous polyurethane-polyurea dispersion is present in a total amount of 1 to 60 wt. % solids based on the total binder content of the coating composition.

6. The aqueous coating composition according to claim 1, wherein the at least one pigment P is present in a total amount of 1 to 40 wt. % based on the total weight of the coating composition.

7. The aqueous coating composition according to claim 1, wherein a neutralization level of the at least one polycarboxylic acid PC is at least 5%.

8. The aqueous coating composition according to claim 1, wherein the dicarboxylic acid has the general formula (I)

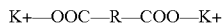

K+—OOC—R—COO—K+ in which
    R is selected from the group consisting of a linear or branched saturated $C_4$-$C_{30}$ alkyl group, a linear or branched unsaturated $C_{10}$-$C_{72}$ alkyl group, a cycloalkyl group and an aromatic group, and
    K+ is selected from the group consisting of hydrogen and a cation.

9. The aqueous coating composition according claim 1, wherein the dicarboxylic acid is selected from the group consisting of azelaic acid, pimelic acid, suberic acid, sebacic acid, dodecandioic acid and phthalic acid and mixtures thereof.

10. The aqueous coating composition according to claim 1, wherein the at least one polycarboxylic acid PC is present in a total amount of 0.01 to 4 wt. %, based on the total weight of the coating composition.

11. The aqueous coating composition according to claim 1, wherein the at least one solvent S is selected from the group consisting of water, alkoxy-$C_2$-$C_{10}$ alcohols, ketones, esters, amides, methylal, butylal, 1,3-dioxolane, glycerol formal, and mixtures thereof.

12. A method for producing an aqueous coating composition, comprising
    (1) providing a solution comprising at least one polycarboxylic acid PC, at least one solvent S, and optionally at least one neutralizing agent and
    (2) adding the solution provided in step (1) to an aqueous composition comprising at least one anionically stabilized binder B and at least one color pigment P,
    wherein the at least one polycarboxylic acid PC is a dicarboxylic acid.

13. A method for producing a multicoat paint system (M) on a substrate (S), comprising the following steps:
    (1) optionally producing a cured first coating layer (S1) on the substrate (S) by application of a composition (Z1) to the substrate (S) and subsequent curing of the applied composition (Z1),
    (2) producing a basecoat layer (BL2a) or at least two directly consecutive basecoat layers (BL2-x) directly on the first coating layer (S1) by application of an aqueous basecoat material (bL2a) directly to the first coating layer (S1) or directly consecutive application of at least two aqueous basecoat materials (bL2-x) directly to the first coating layer (S1),
    (3) producing a clearcoat layer (C) directly on the basecoat layer (BL2a) or on the topmost basecoat layer (BL2-z) by application of a clearcoat material (cm) directly to the basecoat layer (BL2a) or to the topmost basecoat layer (BL2-z), and
    (4) jointly curing the basecoat layer (BL2a) and the clearcoat layer (C) or the basecoat layers (BL2-x) and the clearcoat layer (C), wherein
the at least one basecoat material (bL2a) or at least one of the basecoat materials (bL2-x) comprises a composition according to claim 1.

14. A multicoat paint system obtainable by the method according to claim 13.

15. The aqueous coating composition according to claim 1, wherein the at least one anionically stabilized binder B is present in a total amount of 50 to 90 wt. % solids based on the total binder content of the coating composition.

16. The aqueous coating composition according to claim 1, wherein the at least one anionically stabilized binder B is present in a total amount of 55 to 85 wt. % solids based on the total binder content of the coating composition.

17. The aqueous coating composition according to claim 3, wherein the aqueous polyurethane-polyurea dispersion is present in a total amount of 5 to 50 wt. % solids based on the total binder content of the coating composition.

18. The aqueous coating composition according to claim 3, wherein the aqueous polyurethane-polyurea dispersion is present in a total amount of 10 to 40 wt. % solids based on the total binder content of the coating composition.

19. The aqueous coating composition according to claim 3, wherein the aqueous polyurethane-polyurea dispersion is present in a total amount of 15 to 45 wt. % solids based on the total binder content of the coating composition.

\* \* \* \* \*